US012728648B2

(12) United States Patent
Byun et al.

(10) Patent No.: US 12,728,648 B2
(45) Date of Patent: Sep. 8, 2026

(54) 3D SURFACE PRINTING APPARATUS FOR THE EDGE AREA OF SUBSTRATE

(71) Applicant: ENJET CO. LTD., Suwon-si (KR)

(72) Inventors: Do Young Byun, Seoul (KR); Baek Hoon Seong, Hwaseong-si (KR); Won-Il Son, Daejeon (KR)

(73) Assignee: ENJET CO. LTD., Suwon-si (KR)

( * ) Notice: Subject to any disclaimer, the term of this patent is extended or adjusted under 35 U.S.C. 154(b) by 140 days.

(21) Appl. No.: 18/618,545

(22) Filed: Mar. 27, 2024

(65) Prior Publication Data

US 2024/0326468 A1 Oct. 3, 2024

(30) Foreign Application Priority Data

Mar. 27, 2023 (KR) ........................ 10-2023-0039653

(51) Int. Cl.

| | |
|---|---|
| ***B41J 3/407*** | (2006.01) |
| ***B41J 2/045*** | (2006.01) |
| ***B41J 2/085*** | (2006.01) |
| ***B41J 2/175*** | (2006.01) |
| ***B41J 25/00*** | (2006.01) |
| ***C09D 11/30*** | (2014.01) |

(52) U.S. Cl.

CPC ......... *B41J 3/4073* (2013.01); *B41J 2/04566* (2013.01); *B41J 2/04593* (2013.01); *B41J 2/085* (2013.01); *B41J 2/17523* (2013.01); *B41J 25/001* (2013.01); *C09D 11/30* (2013.01)

(58) Field of Classification Search

None

See application file for complete search history.

(56) References Cited

U.S. PATENT DOCUMENTS

2020/0361146 A1* 11/2020 Zhou ..................... B29C 64/209

FOREIGN PATENT DOCUMENTS

| | | | |
|---|---|---|---|
| CN | 1675721 | A | 9/2005 |
| KR | 10-2005-0014856 | A | 2/2005 |
| KR | 10-2013-0129682 | A | 11/2013 |
| KR | 10-2016-0111768 | A | 9/2016 |
| KR | 10-2344277 | B1 | 12/2021 |
| KR | 10-2022-0039448 | A | 3/2022 |

OTHER PUBLICATIONS

Office Action dated Jan. 24, 2025 in Korean Application No. 10-2023-0039653.

Office Action dated Feb. 26, 2025 in Taiwanese Application No. 113111166.

* cited by examiner

*Primary Examiner* — Alejandro Valencia

(74) *Attorney, Agent, or Firm* — SALIWANCHIK, LLOYD & EISENSCHENK

(57) ABSTRACT

The present disclosure relates to a 3D surface printing apparatus for the edge area of substrate, the apparatus including a jig part that erects the substrate and immobilizes it, a nozzle part that comprises a nozzle that ejects ink through Electrohydrodynamic (EHD) jetting by applying a voltage to an electrode, from above the erected substrate; a moving part that moves the nozzle left and right; and a control part that controls a printing operation, wherein the moving part prints a pattern that is continuously connected along a front surface of the rim of the substrate, a side surface of the substrate and a rear surface of the rim of the substrate as it horizontally moves the nozzle, and the control part controls the printing operation, considering changes in 3D electric field distribution.

27 Claims, 29 Drawing Sheets

Figure 7:
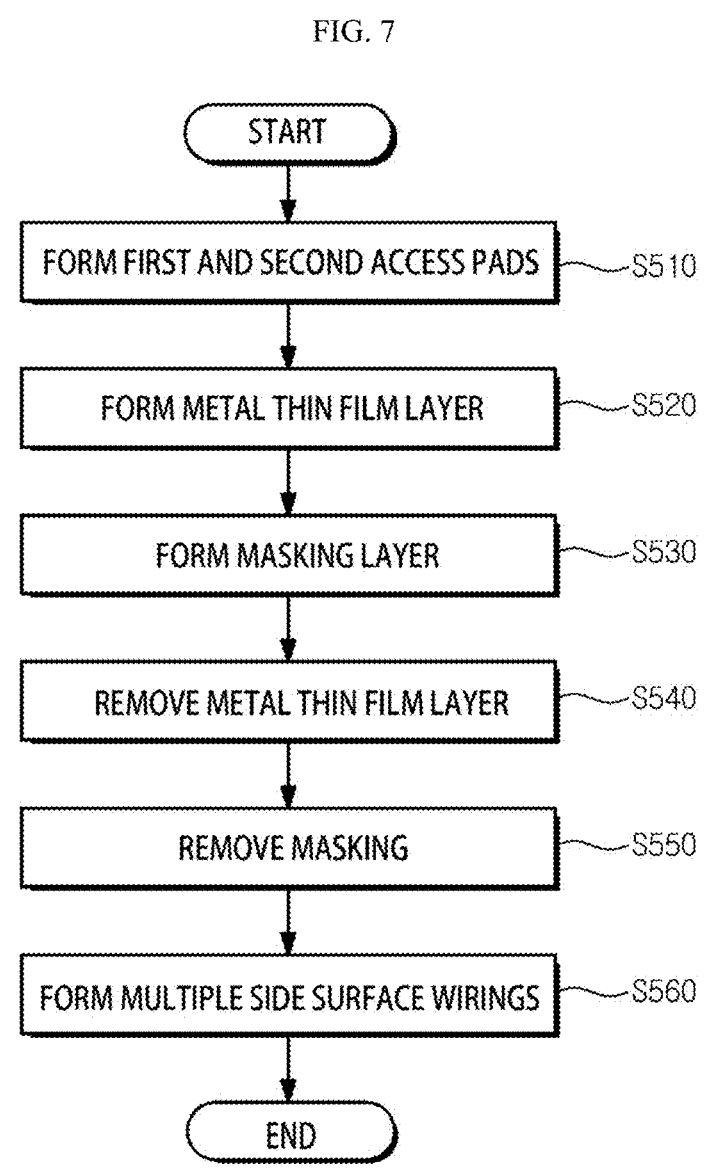

START

FORM FIRST AND SECOND ACCESS PADS ~S510

FORM METAL THIN FILM LAYER ~S520

FORM MASKING LAYER ~S530

REMOVE METAL THIN FILM LAYER ~S540

REMOVE MASKING ~S550

FORM MULTIPLE SIDE SURFACE WIRINGS ~S560

END

ROBOT SPEED : LEFT :20mm/s RIGHT : 50mm/s

Multi Nozzle

(b)

(a)

(b)

3D SURFACE PRINTING APPARATUS FOR THE EDGE AREA OF SUBSTRATE

CROSS-REFERENCE TO RELATED APPLICATION

This application claims the benefit of Korean Application No. 10-2023-0039653, filed Mar. 27, 2023, which is hereby incorporated by reference in its entirety.

1. Field

The present disclosure relates to a three-dimensional (3D) surface printing apparatus for the edge area of substrate, and more particularly, to a 3D surface printing apparatus for edge area of substrate, that can print to continuously connect an upper and lower surface and side surface of a rim of the substrate for side surface wiring, etc.

2. Background

Self-luminous displays display images without color filters and backlights, and displays using organic light-emitting diodes (organic LEDs) and micro LEDs, which are inorganic light-emitting devices, are known. Especially, recently, displays using micro LEDs, which have better performance in terms of brightness, luminous efficiency, and lifespan than organic light-emitting diodes, have been in the spotlight.

The display using micro LEDs expresses various colors as it is operated in pixel or sub-pixel units made of micro LED elements, and the operation of each pixel or sub-pixel is controlled by a Thin Film Transistor (TFT). A plurality of TFTs are arranged on a flexible substrate, a glass substrate, or a plastic substrate, and the substrate on which the TFT is formed is called a TFT substrate.

In order to drive the TFT substrate, an external circuit (external IC) or a driver circuit (Driver IC), capable of applying current to the TFT substrate, is connected. Generally, the TFT substrate and each circuit are connected through Chip on Glass (COG) bonding or Film on Glass (FOG) bonding, etc. For this connection, a bezel area, which is an area with a certain size area at a rim of the TFT substrate must be secured.

Recently, bezel-less technology has been researched and developed in order to minimize the bezel area on TFT substrates, so as to maximize the active area, which is the area where images are displayed, in display panels employing the TFT substrates. As part of this, a technology is being proposed to form multiple side surface wirings having fine line width at the rim of the substrate. Here, the side surface wiring refers to a wiring that continuously connects the upper and lower surfaces of the rim and side surface of the substrate.

Since the upper and lower surfaces of the rim and side surface of the substrate form a 3D structure, in order to print on the 3D surface, it is general to use a robot capable of 6-axis operation to move along the 3D surface and proceed with printing.

In the present disclosure, an apparatus is proposed that can perform printing on the 3D surface through a 1-axis reciprocating movement that moves the nozzle in left and right directions to form a side surface wiring, wherein the printing can be precisely controlled to have a fine and uniform line width and pitch.

PRIOR ART LITERATURE

Patent Literature

Korean Patent Registration No. 10-2344277

SUMMARY

Therefore, a purpose of the present disclosure is to solve the problems of prior art mentioned above, that is, to provide a 3D surface printing apparatus for the edge area of substrate, that can perform printing regarding a 3D surface while ejecting ink through electrohydrodynamic (EHD) jetting and moving the nozzle left and right, wherein the printing is performed while controlling the effect that a pre-printed pattern has on electric field distribution, so that the printing can be performed regarding the 3D surface precisely with a fine line width.

The tasks to be solved by the present disclosure are not limited to those mentioned above, and other tasks not mentioned will be clearly understood by those skilled in the art from the description below.

The aforementioned purpose may be achieved by A 3D surface printing apparatus for the edge area of substrate, the apparatus including a nozzle part that includes a nozzle that is disposed outside of a side surface of the substrate, to eject ink in a direction horizontal to the substrate, through Electrohydrodynamic (EHD) jetting by applying a voltage to an electrode; a moving part that moves the nozzle in both directions in a normal vector direction of the substrate around a rim of the substrate; and a control part that controls a printing operation, wherein a pattern that is continuously connected along a front surface of the rim of the substrate, a side surface of the substrate and a rear surface of the rim of the substrate is printed as the moving part moves the nozzle in both directions, and the control part controls the printing operation, considering changes in 3D electric field distribution occurred due to changes of a shape and material of a structure surrounding an area being printed and a pre-printed pattern, as printing proceeds.

Here, the apparatus may further include a jig part that vertically erects the substrate and immobilizes it, and the nozzle may eject the ink from above the erected substrate to vertically downwards, and the moving part may move the nozzle to left and right in the normal vector direction of the erected substrate.

Here, the moving part may move the nozzle also in a direction that is horizontal to the substrate, and the control part may control a distance between the nozzle and the side surface of the substrate, during printing, as it moves the nozzle in both directions.

Here, the apparatus may further include a nozzle angle alteration part that alters an angle of the nozzle, and the nozzle angle alteration part may alter the angle of the nozzle towards the substrate when moving the nozzle towards the substrate by the moving part.

Here, the apparatus may further include a substrate angle alteration part that alters an angle of the substrate, and the substrate angle alteration part may alter the angle of the substrate towards the nozzle when moving the nozzle towards the substrate by the moving part.

Here, the control part may obtain, through simulation, the changes in 3D electric field distribution occurred due to changes of the shape and material of the structure surrounding the area being printed and the pre-printed pattern, as printing proceeds.

Here, the control part may consider the changes in 3D electric field distribution occurred due to changes of temperature or humidity as printing proceeds.

Here, the control part may control the voltage being applied to the electrode or control a flow rate of the ink being ejected from the nozzle, considering the changes in 3D electric field distribution occurred due to the pre-printed pattern.

Here, the apparatus may further include an imaging part that photographs an image of the ink being ejected from the nozzle, and the control part may measure a diameter of the ink being ejected from the nozzle, based on the image photographed by the imaging part, and print while controlling the diameter of the ink, in real time.

Here, the apparatus may further include an imaging part that photographs a line patterned on the substrate, and the control part may obtain a line width of the patterned line based on an image photographed by the imaging part, and store information of the line width and printing conditions regarding the line width, and predict a diameter of the ink being ejected from the nozzle based on changes of the line width, and print while controlling the diameter of the ink, in real time.

Here, the control part may predict the diameter of the ink being ejected from the nozzle based on the information of the line width of the line patterned on a same substrate.

Here, the control part may predict the diameter of the ink being ejected from the nozzle based on the information of the line width of the patterned line, stored regarding a plurality of substrates, in repetitive printing processes.

Here, the substrate may be any one of a plastic substrate, a glass substrate, a silicon substrate, and a substrate where plastic and glass are formed in a multiple layer form.

Here, the control part may control the diameter to be constant.

Here, control part may control the width by controlling at least one of a distance between the nozzle and the substrate, a size of the voltage being applied to the electrode for the Electrohydrodynamic (EHD) jetting, a flow rate of the ink being ejected from the nozzle, and an ejecting angle.

Here, the nozzle part may further include a pneumatic controller that controls a pneumatic inside the nozzle, and the control part may control the flow rate of the ink by controlling the pneumatic.

Here, the apparatus may further include a syringe pump that supplies ink to inside of the nozzle, wherein the control part may control the flow rate of the ink by controlling the syringe pump.

Here, it is desirable that a line width of the pattern being printed is 5 μm to 15 μm or less which cannot be realized with existing dispensing technology.

Here, it is desirable that a line width of the pattern being printed is 150 μm or less, which is the level of a control circuit electrode of a 300 PPI grade display.

Here, it is desirable that a line width of the pattern being printed is 50 μm or less, which is the level of a control circuit electrode of a 600 PPI grade display.

Here, it is desirable that a line width of the pattern being printed is 20 μm or less, which is the level of a control circuit electrode of a 800 PPI grade display.

Here, it is desirable that a line width of the pattern being printed is 10 μm or less, which is the level of a control circuit electrode of a 1000 PPI grade display.

Here, the ink is a masking ink, that may be dissolvable by a polar solvent.

Here, the ink may include a water-soluble polymer, a solvent for dissolving the water-soluble polymer, a first additive for imparting electrical conductivity, and a second additive for imparting a Thixotropic Index (T.I).

Here, the water-soluble polymer may include any one or more of starch, gums, polysaccharide, cellulose having hydroxyl groups, poly(acrylicpolyol) (PAO), polyethylene oxide (PEO), polyvinyl alcohol (PVA), polyacrylamide (PAAM), polyvinylpyrrolidone (PVP), polyacrylic acid (PAA), polystyrenesulfonic acid (PSSA), polyphosphoric acid (PPA), polyethylenesulfonic acid (PESA), polyethyleneimide (PEI), polyamines (PA), polyamideamine (PAMAM), poly(2-vinylpiperidine salt), and Poly(vinylamine salt), and the solvent may be water or alcohol.

Here, the first additive may be electrolyte.

Here, the electrolyte may include any one or more of sodium chloride (NaCl), sulfonic acid, hydrochloric acid, sodium hydroxide (NaOH), and potassium hydroxide (KOH).

Here, the first additive may further include conductive particles.

Here, the ink is a conductive ink, enabling to perform a process of directly printing electrodes.

Here, the conductive particles may include any one or more of silver (Ag) nanoparticles, gold (Au) nanoparticles, carbon nanoparticles, copper particles, and metallic material containing conductive polymer dispersion.

Here, the ink may be a conductive ink that forms a side surface wiring.

In addition, the aforementioned purpose may be achieved by a 3D surface printing apparatus for the edge area of substrate, the apparatus including a stage that seats the substrate; a nozzle part that includes a nozzle that ejects ink through Electrohydrodynamic (EHD) jetting by applying a voltage to an electrode, from above the substrate; a moving part that moves the nozzle left and right; and a control part that controls a printing operation, wherein a pattern that is continuously connected along a rim of a front surface and a side surface of the substrate is printed as the moving part horizontally moves the nozzle that ejects the ink; turns over the substrate seated on the stage and seats and aligns the substrate on the stage; and then a pattern that is continuously connected along a rim of a rear surface and a side surface of the substrate is printed as the moving part horizontally moves the nozzle that ejects the ink, so as to print the pattern that is continuously connected along the front surface of the rim and side surface of the substrate and the rear surface of the rim of the substrate, and the control part controls the printing operation, considering changes in 3D electric field distribution occurred due to a pre-printed pattern.

According to the 3D surface printing apparatus for the edge area of substrate of the present disclosure mentioned above, it is possible to print a 3D surface corresponding to the edge area of the substrate with 1-axis driving of moving the nozzle left and right reciprocally, thereby providing an advantage that the configuration is simple and easy to control.

Further, there is also an advantage that high-speed printing regarding a 3D surface is possible.

Further, since the next printing is performed considering changes in the electric field caused by a pre-printed pattern, there is an advantage of high printing precision and improved uniformity of the line width.

In addition, since EHD jetting is used, and the line width of the ink being ejected is measured in real time, to control the line width, there is an advantage that printing regarding a 3D surface can be performed with precision in fine line width.

Further, there is also an advantage that when printing is performed using a 3D surface printing apparatus for the edge area of substrate of the present disclosure using the ink ingredients proposed in the present disclosure, precision of the printing can be maximized.

BRIEF DESCRIPTION OF THE DRAWINGS

FIG. 4 is a side view illustrating the side surface wiring portion of FIG. 1;

FIG. 7 is a flow chart illustrating another process of forming the side surface wiring of FIG. 1, and FIG. 8 is a process diagram according to FIG. 7;

Figure 10:
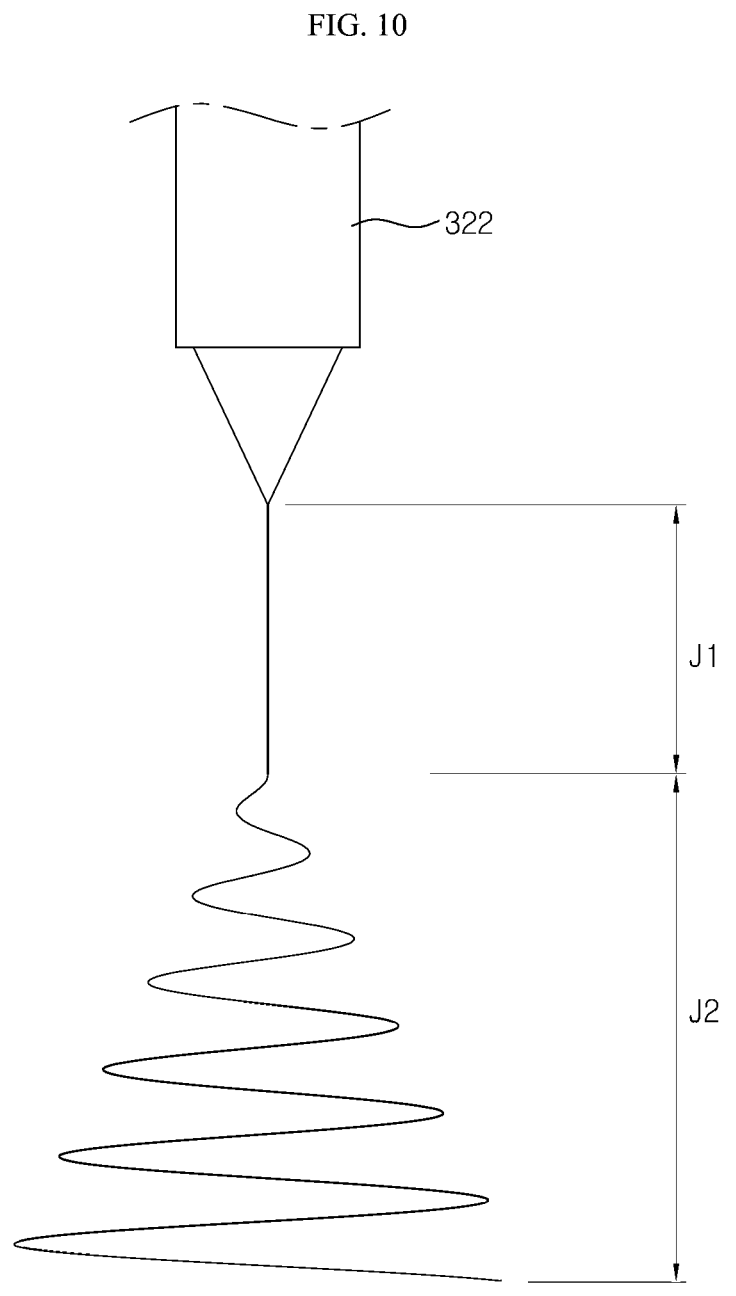

FIG. 10 is a view illustrating how ink is being ejected from an EHD jetting nozzle of the present disclosure;

DETAILED DESCRIPTION

Figure 1:
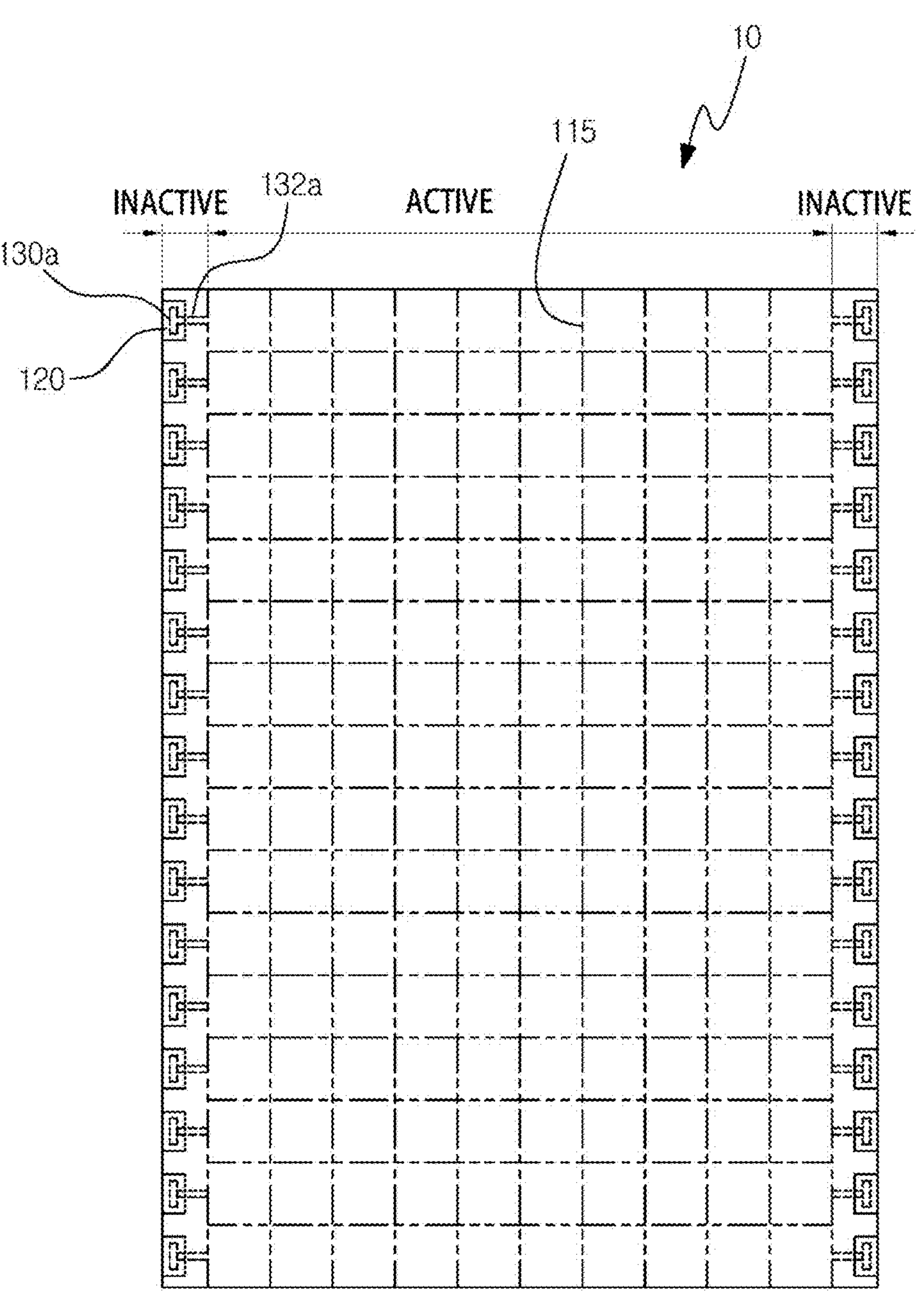
FIG. 1 is a plane view illustrating an example of a display module where a side surface wiring is formed.

Specific details of the embodiments are included in the detailed description and drawings.

The advantages and features of the present disclosure and methods for achieving them will become clear by referring to the embodiments described in detail below along with the accompanying drawings. However, the present disclosure is not limited to the embodiments disclosed below and may be implemented in various different forms, and thus the present embodiments are merely provided to ensure that the disclosure of the present disclosure is complete and to fully inform those skilled in the technical field to which the present disclosure pertains the scope of the disclosure, and the present disclosure is only defined by the scope of the claims. Like reference numerals refer to like elements throughout the specification.

Hereinbelow, the present disclosure will be described with reference to the drawings for describing a 3D surface printing apparatus for edge area of the substrate according to the embodiments of the present disclosure.

A 3D surface printing apparatus for edge area of the substrate according to the present disclosure may be used to print to continuously connect an upper and lower surface of a rim and a side surface of the substrate. For one example, it may be used to form a side surface wiring of a display module that uses a micro LED element, but without limitation thereto, it may be used to form a side surface wiring of a display module that uses an OLED element. Hereinbelow, description will be made with relation to a side surface wiring of an LED display module that is an embodiment where a 3D surface printing apparatus for edge area of the substrate of the present disclosure is used.

Figure 2:
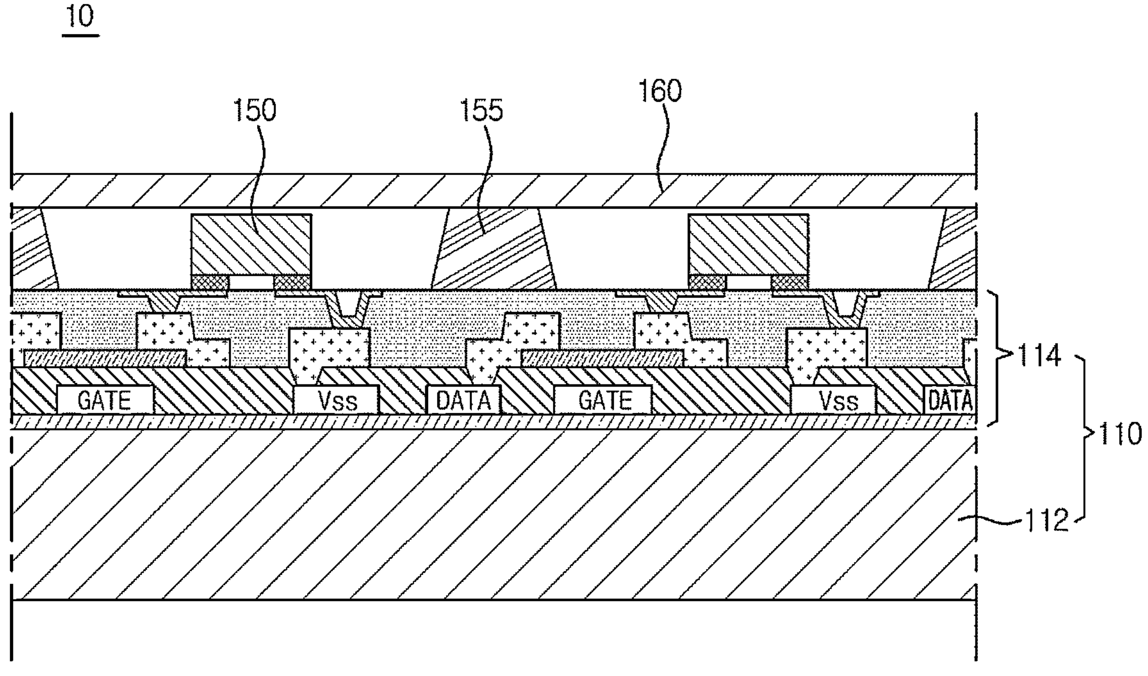
FIG. 2 is a cross-sectional view of FIG. 1.
Figure 3:
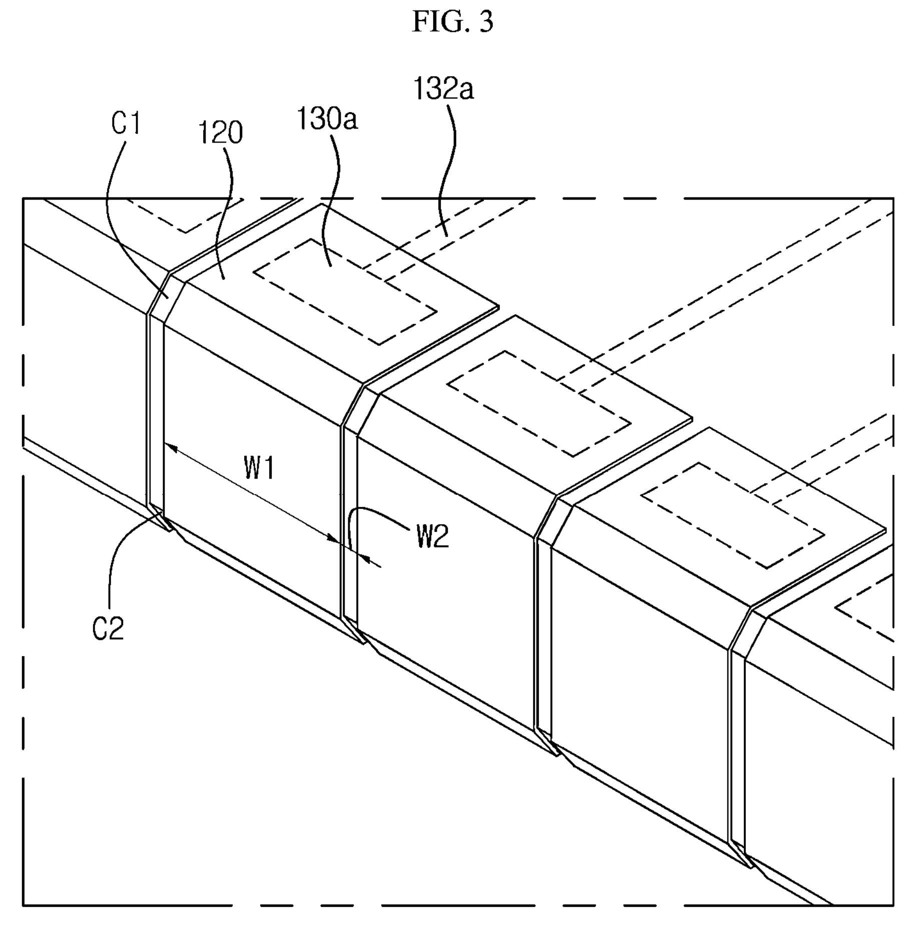
FIG. 3 is a partially enlarged perspective view of the side surface wiring portion of FIG. 1.
Figure 4:
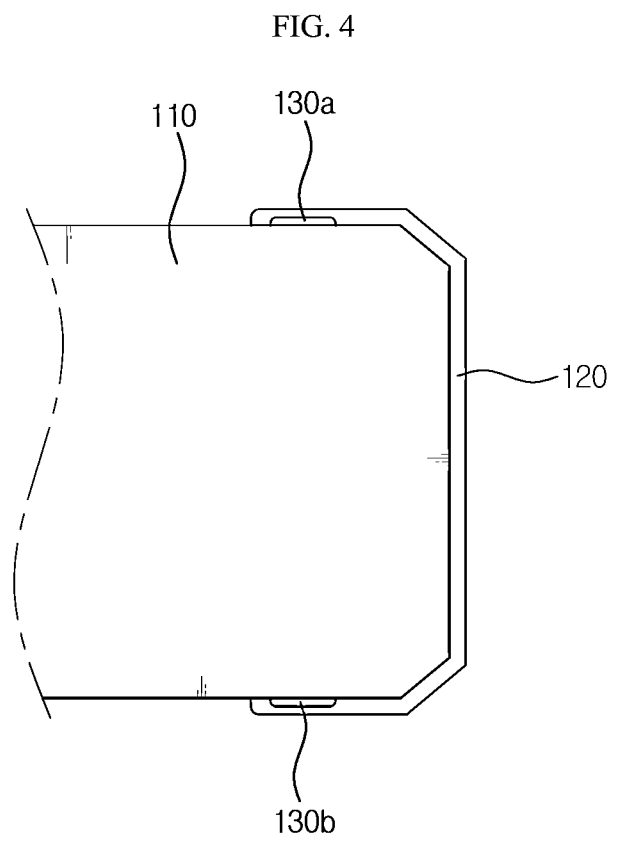

FIG. 1 is a plane view illustrating an example of a display module where a side surface wiring is formed, FIG. 2 is a cross-sectional view of FIG. 1, FIG. 3 is a partially enlarged perspective view of the side surface wiring portion of FIG. 1, and FIG. 4 is a side view illustrating the side surface wiring portion of FIG. 1.

A display module 10 illustrated in FIG. 1 may be a panel that displays a screen using a micro LED.

The display module 10 may be one of a flat display panel, and may be composed of a plurality of inorganic light emitting diodes (LEDs), each measuring less than 100 micrometers.

A micro LED 150 has rapid response speed, low power, and high brightness. Specifically, the micro LED 150 has higher efficiency in converting electricity into photons compared to existing liquid crystal display (LCD) or organic light emitting diode (OLED). Further, the micro LED 150 is capable of realizing high resolution, excellent color, contrast, and brightness, so it can accurately express a wide range of colors and produce a clear screen even outdoors in bright sunlight. In addition, the micro LED 150 is resistant to burn-in phenomenon and generates less heat, ensuring a long lifespan without deformation.

The micro LED 150 may have a flip chip structure in which anode and cathode electrodes are formed on a same first surface and a light emitting surface is formed on a second surface located on the opposite side of the first surface.

A substrate 112 may have, on its front surface, a TFT layer 114 where a Thin Film Transistor (TFT) circuit is formed, and may have, on its rear surface, a circuit (not illustrated) that supplies power to the TFT circuit and that is electrically connected to a separate control substrate. The TFT circuit may drive multiple pixels arranged on the TFT layer 114.

According to the present disclosure, the substrate 112 may not only be a glass substrate but may also be a plastic substrate or silicon substrate having the form of a flexible film. For example, the plastic substrate may be a Polyethylene Terephthalate (PET) substrate. In addition, when preparing an OLED display module, the substrate may be a substrate where a glass substrate and a plastic substrate are formed in a multiple layer form.

A front surface of the substrate 112 may be divided into an active area and an inactive area. A front surface active area may correspond to an area on the front surface that is occupied by the TFT layer 114, and the inactive area may be an area excluding the area that is occupied by the TFT layer 114 on the front surface of the substrate 112. Here, a rim area of the substrate 112 may be the inactive area, and the remaining area may be the active area. Here, the inactive area may be formed on an entirety of four sides of the substrate, or on only some of the four sides. In FIG. 1, the inactive area is formed on left and right sides of the substrate 112. The rear surface of the substrate 112 may also be divided into an active area and an inactive area in the same form as the front surface.

In the rim area of the substrate 112, multiple side surface wirings 120 may be formed at certain intervals. By forming the multiple side surface wirings 120, the display module 10 may minimize the inactive area and maximize the active area on the front surface of the TFT substrate 110, thereby realizing bezel-lessness and increasing the mounting density of the micro LED 150 regarding the display module 10. In a case of connecting multiple display modules 10 that realize the bezel-lessness as such, a large format display (LFD) that can maximize the active area may be provided. In this case, as the inactive area is minimized, each display module 10 may be formed such that a pitch between each of the pixels of the display modules 10 that are adjacent to each other is maintained the same as the pitch of each of the pixels within a single display module 10. Accordingly, it is possible to inhibit a seam from occurring in a connecting portion between each display module 10.

As illustrated in FIGS. 3 and 4, a corner included in the inactive area of the substrate 112 may be chamfer-processed to form a chamfer surface C1, C2 having a predetermined angle. The chamfer surface C1, C2 may be formed on a corner between the front surface and the side surface of the substrate 112, and on a corner between the rear surface and the side surface of the substrate 112.

The active area may be divided into multiple pixel areas 115 in which multiple pixels are each arranged. The multiple pixel areas 115 may be divided into various forms. For example, the multiple pixel areas 115 may be divided into a matrix form. Each pixel area 115 may include a sub pixel area where multiple color micro LEDs 150, that are multiple sub pixels, are mounted, and a pixel circuit area where a pixel circuit for driving each sub pixel, is arranged.

The multiple micro LEDs 150 are transcribed to the pixel circuit area of the TFT layer 114, and electrode pads of each micro LED 150 may each be electrically connected to the electrode pads formed on the sub pixel area of the TFT layer 114. In the display module 10, the multiple micro LEDs 150 may each be divided by a black matrix 155, and a transparent cover layer 160 may be provided for protecting the multiple micro LEDs 150 and the black matrix 155, together.

The edge area may include a first area that is an area where the side surface wiring 120 is formed and that corresponds to the side surface of the substrate 112, a second area that is the inactive area of the front surface of the substrate adjacent to the side surface of the substrate, and a third area that is the inactive area of the rear surface of the substrate adjacent to the side surface of the substrate.

Multiple first access pads 130*a* may be arranged in the second area at certain intervals. The multiple first access pads 130*a* may be electrically connected with each sub pixel through each wiring 132*a*. Likewise, multiple second access pads 130*b* may be arranged in the third area at certain intervals. The multiple second access pads 130*b* may each be electrically connected with the circuit arranged on the rear surface of substrate 112 through wiring.

In the edge area of the substrate 112, multiple side surface wirings 120 that mutually electrically connect the multiple first and second access pads 130*a*, 130*b*, are formed. For example, to one side surface wiring 120, one first access pad 130*a* and one second access pad 130*b* may be correspondingly connected.

Referring to FIG. 3 and FIG. 4, the side surface wiring 120 electrically connects the first access pad 130*a* and the second access pad 130*b*, and may be formed in the edge area of the substrate 112 to be spaced apart at certain intervals.

The side surface wiring 120 is continuously connected between the front surface of the substrate 112 and the rear surface of the substrate 112 through the side surface of the substrate 112, and assuming that the side surface wiring 120 is unfolded, it may be formed in an approximately straight line form.

One end of the side surface wiring 120 may completely cover or partially cover the first access pad 130*a*, to be electrically connected, and the other end of the side surface wiring 120 may completely cover or partially cover the second access pad 130*b*, to be electrically connected.

To inhibit disconnection and to ensure stable power supply and signal transmission to the TFT circuit, it is desirable to make a width (W1) of the side surface wiring 120 as wide as possible. Therefore, it is desirable that the side surface wiring 120 maintains a minimum interval W2 with another adjacent side surface wiring 120 to the degree so as not to be shorted.

In order to maximize the width W1 of the side surface wiring 120 when preparing the display module 10, the 3D surface printing apparatus for edge area of substrate according to the present disclosure that will be described later, may be used to print a masking pattern having a fine line width W2 (for example, 25 μm) between the side surface wirings 120 adjacent to each other.

In order to form a masking pattern of such high-precision, the 3D surface printing apparatus for edge area of the substrate of the present disclosure uses an ElectroHydroDynamics (EHD) jet printing. EHD jet printing is a technology of ejecting a thin line width from a nozzle through the action of pneumatic and electric field attraction. As a Taylor cone shape is implemented at a discharge port of the nozzle through electric field attraction, the ejected line width can be refined compared to a general pneumatic dispenser, and precision ejecting is possible while maintaining a relatively wide distance between the nozzle 322 and the substrate 112. For example, in the case of a general pneumatic dispenser, the spaced apart distance between the nozzle and the substrate 112 must be kept extremely close to the level of 200 μm or less in order to eject in a line width of 400 μm. However, in the case of the EHD jet printing, printing can be performed while maintaining a spaced apart distance of approximately 1 mm when ejecting a line width of approximately 50 μm.

In the description hereinbelow, a process of forming a side surface wiring 120 regarding the display module 10 will be described.

Figure 5:
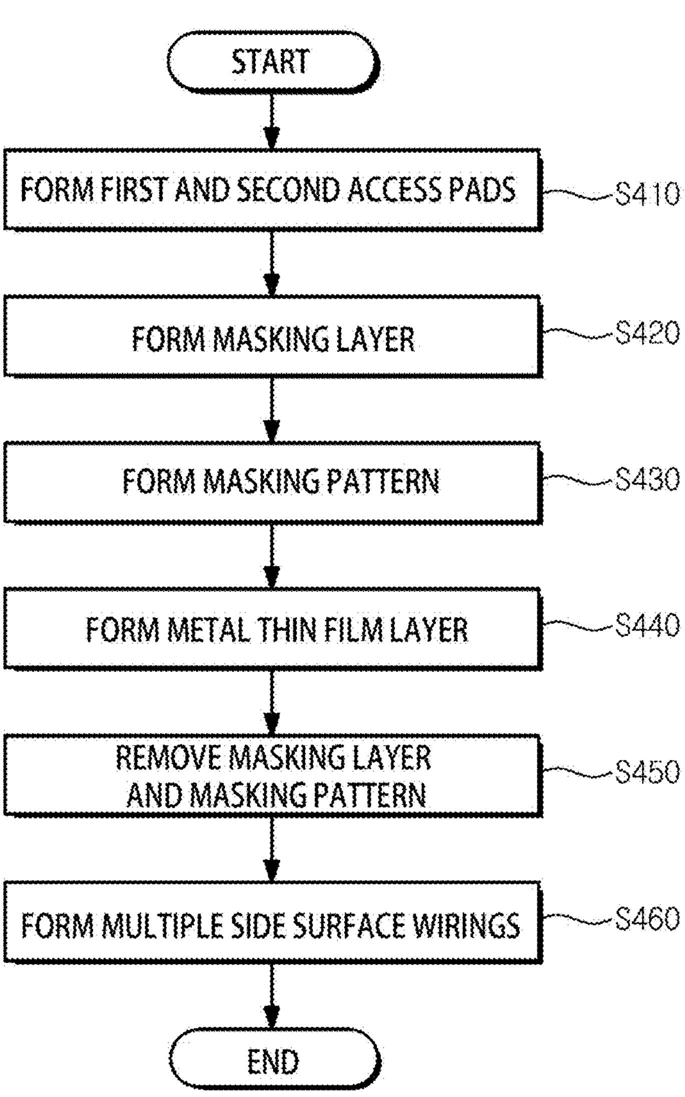
FIG. 5 is a flow chart illustrating the process of forming the side surface wiring of FIG. 1.
Figure 6:
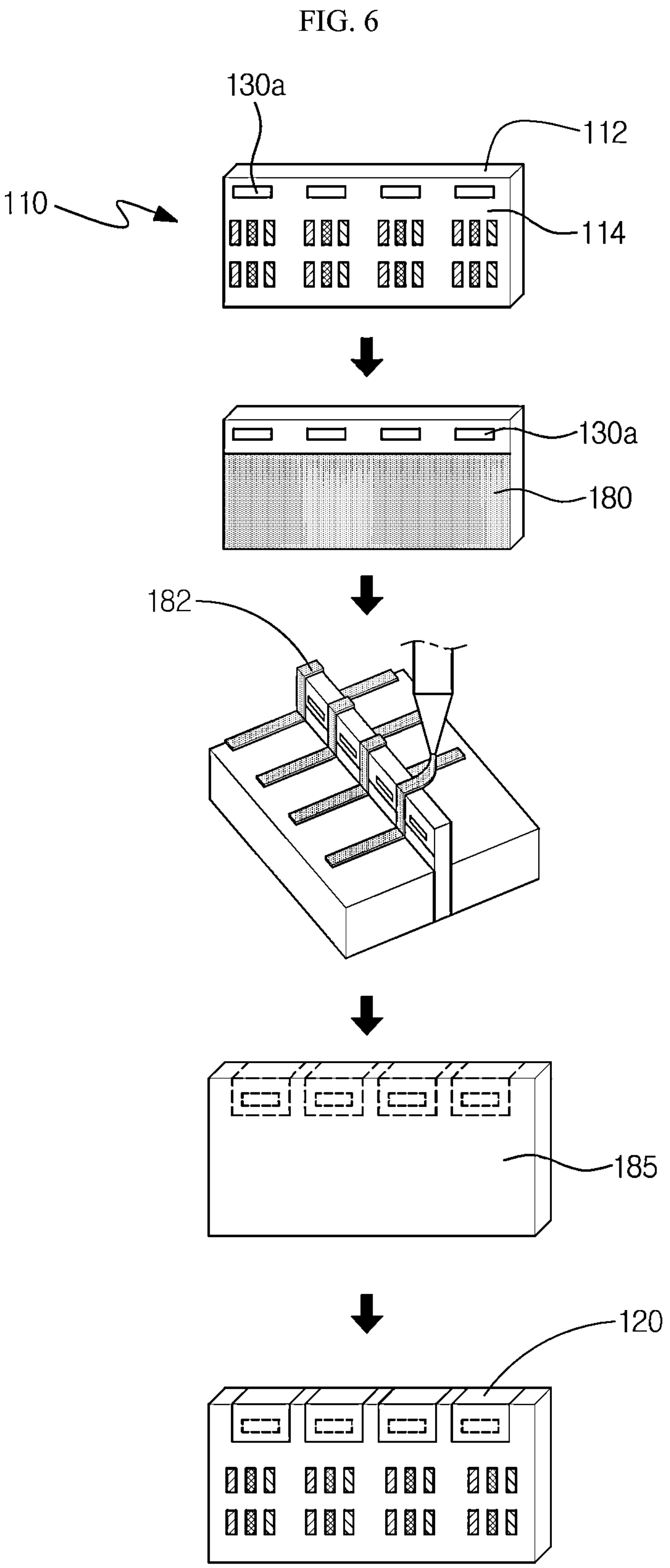
FIG. 6 is a process diagram according to FIG. 5.

FIG. 5 is a flow chart illustrating the process of forming the side surface wiring of FIG. 1, and FIG. 6 is a process diagram according to FIG. 5.

Multiple first access pads 130*a* are formed at certain intervals in a second area that is included in the edge area of the front surface of the substrate 112 where the TFT layer 114 is formed, and multiple second access pads 130*b* are formed at certain intervals in a third area that is included in the edge area of the rear surface of the substrate 112 (S410).

Next, multiple side surface wirings 120 are formed in the edge area of the substrate 112. Referring to FIG. 6, a masking layer 180 of a large size area that covers the front surface and rear surface of the substrate 112 is formed (S420). Here, the masking layer 180 is not formed in the edge area of the substrate 112 so as to form a metal thin film layer 185 to be processed afterwards.

Next, a masking pattern 182 is formed in the edge area of the substrate 112 (S430), The area where the masking pattern 182 is formed forms a fine line width between the side surface wiring 120, and the masking pattern 182 may be formed by the 3D surface printing apparatus for edge area of the substrate of the present disclosure that will be described later on.

Next, a metal thin film layer 185 is formed on the front surface, side surface and rear surface of the substrate 112 (S440). The metal thin film layer 185 covers each of the first access pad 130*a* and the second access pad 130*b* that corresponds to each of the first access pad 130*a*.

Next, the masking layer 180 and the masking pattern 182 are removed from the substrate 112 using a peeling liquid (S450). Here, when the masking layer 180 and the masking pattern 182 are removed from the substrate 112, the metal thin film layer 185 formed on the masking layer 180 and the masking pattern 182 are removed together. Accordingly, the metal thin film layer 185 remaining in the edge area of the substrate 112 forms multiple side surface wirings 120 that electrically connect the first and second access pads 130*b* (S460).

Figure 8:
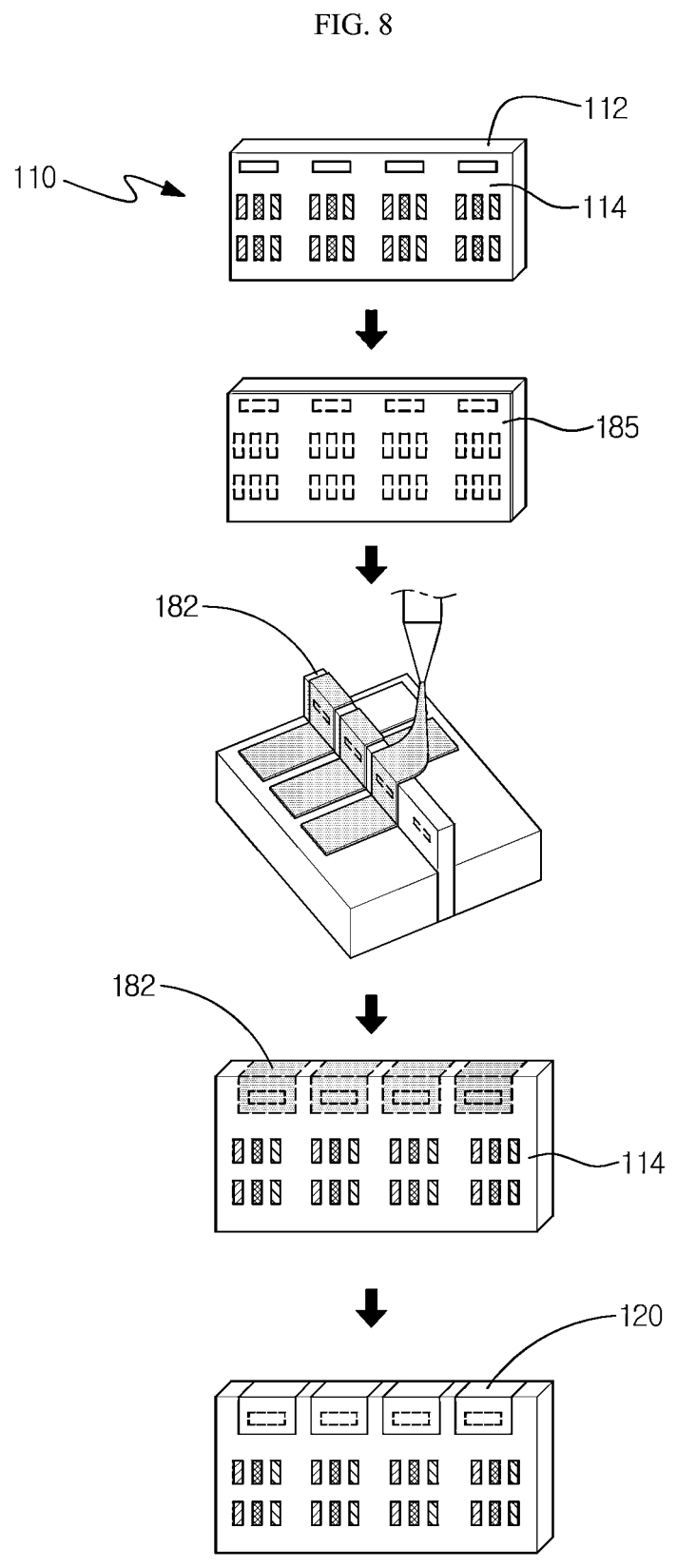

FIG. 7 is a flow chart illustrating another process of forming the side surface wiring of FIG. 1, and FIG. 8 is a process diagram according to FIG. 7.

Multiple first access pads 130*a* are formed at certain intervals in a second area that is included in the edge area of the front surface of the substrate 112 where the TFT layer 114 is formed, and multiple second access pads 130*b* are formed at certain intervals in a third area included in the edge area of the rear surface of the substrate 112 (S510).

Next, a metal thin film layer 185 is formed on the front surface, side surface and rear surface of the substrate 112 (S520). The metal thin film layer 185 covers each of the first access pad 130*a* and the second access pad 130*b* that corresponds to each of the first access pad 130*b*.

Next, the masking pattern 182 is formed in the edge area of the substrate (S530). In the aforementioned embodiment, the masking pattern 182 is formed to form a fine line width between the side surface wiring 120, but in the present embodiment, the side surface wiring 120 is formed in the area where the masking pattern 182 is formed. That is, the masking pattern 182 may be formed by the 3D surface printing apparatus for edge area of the substrate of the present disclosure such that it covers the first access pad 130*a* and the second access pad 130*b*.

Next, the metal thin film layer 185 is removed using the peeling liquid (S540). Here, the metal thin film layer 185 located below the masking pattern 182 is not removed.

Next, the masking pattern 182 is removed using another peeling liquid (S550). Therefore, the metal thin film layer 185 located below the masking pattern 182 is exposed, forming multiple side surface wirings 120 (S560).

Two examples regarding the process of forming the side surface wiring 120 were described with reference to FIGS. 5 to 8, but there is no limitation thereto, and thus various modifications can be made and implemented.

Hereinbelow, a 3D surface printing apparatus for edge area of the substrate according to the present disclosure will be described with reference to FIGS. 9 to 15.

Figure 9:
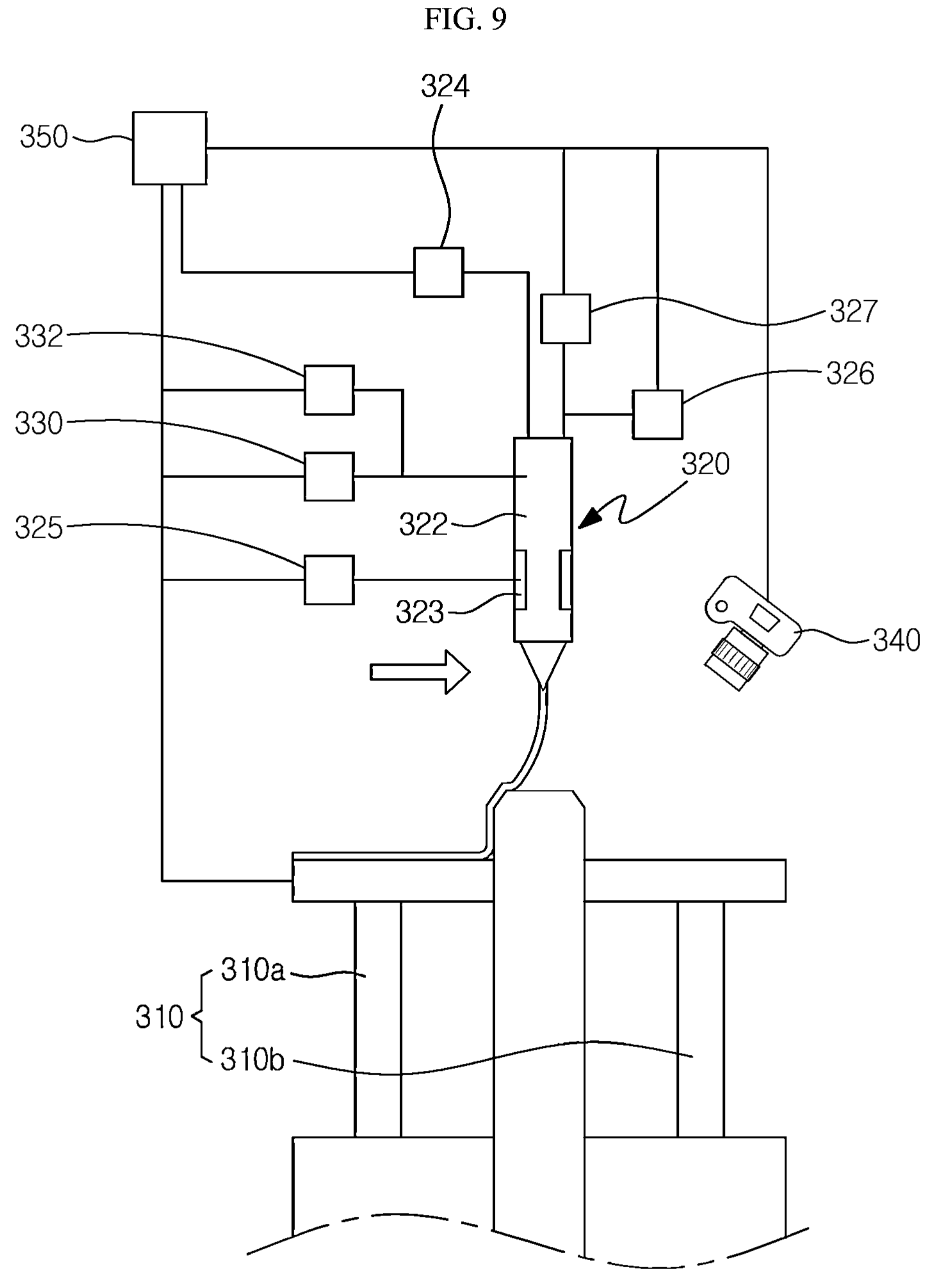
FIG. 9 is a schematic configurative view of a 3D surface printing apparatus for the edge area of substrate according to an embodiment of the present disclosure.
Figure 11A:
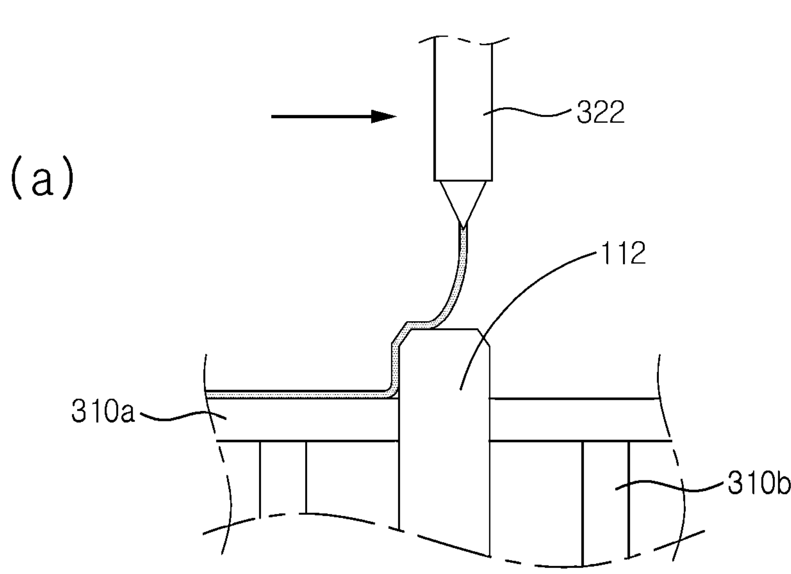
FIGS. 11A and 11B are views illustrating a process of printing a 3D surface connecting an upper and lower surface of a rim and side surface of the substrate using the 3D surface printing apparatus for the edge area of substrate of FIG. 9.
Figure 11B:
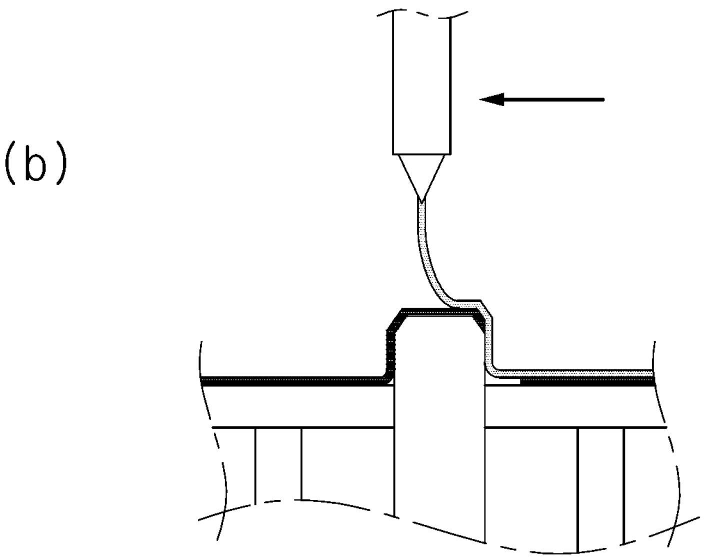
Figure 12:
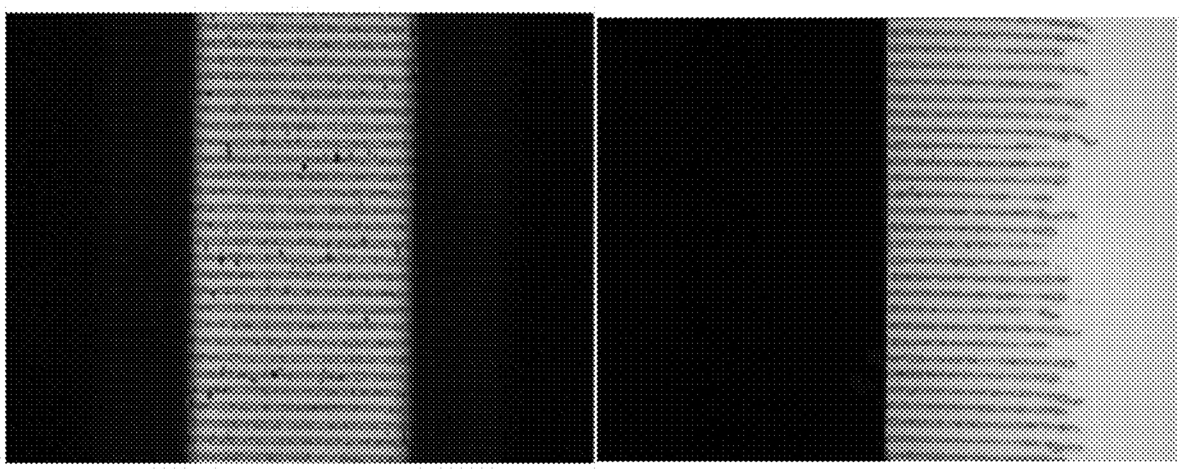
FIG. 12 illustrates a pattern printed on a rim at one side of the substrate and a side surface of the substrate according to the present disclosure.
Figure 13:
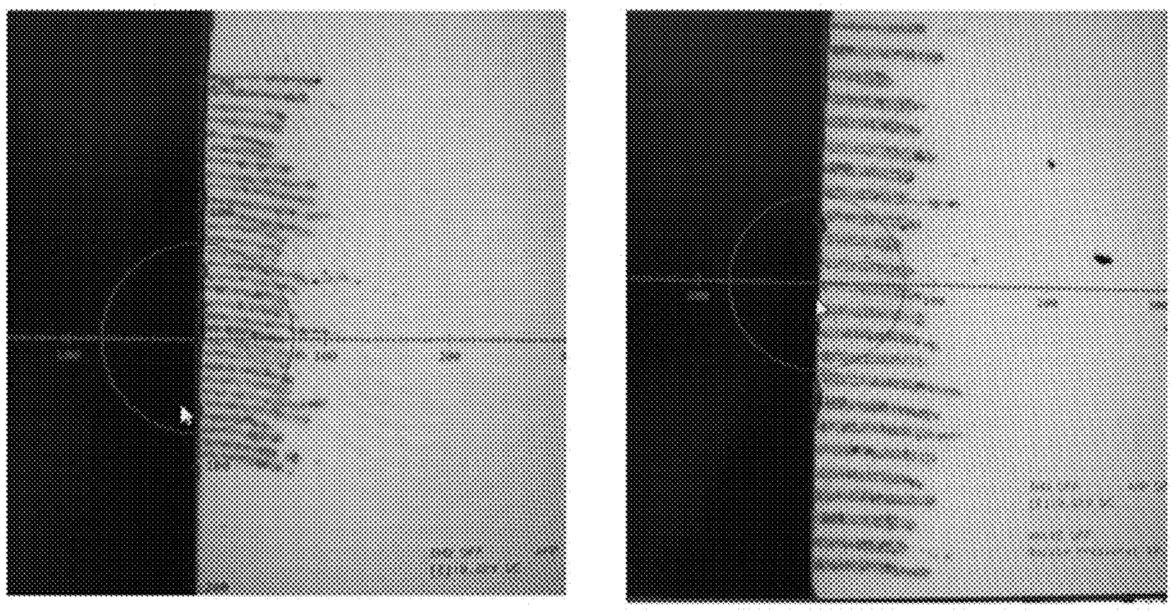
FIG. 13 illustrates a printing result according to the speed of a transfer part.
Figure 14:
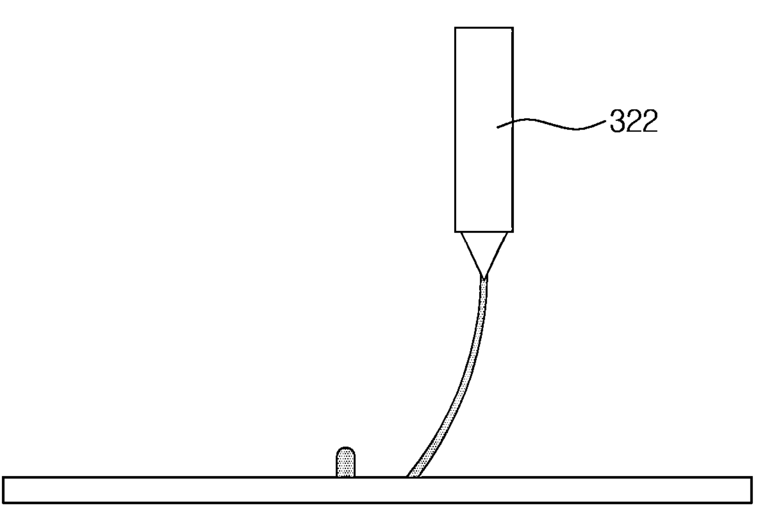
FIG. 14 is a view describing the effect that a pre-printed pattern has on side surface wiring printing.
Figure 15:
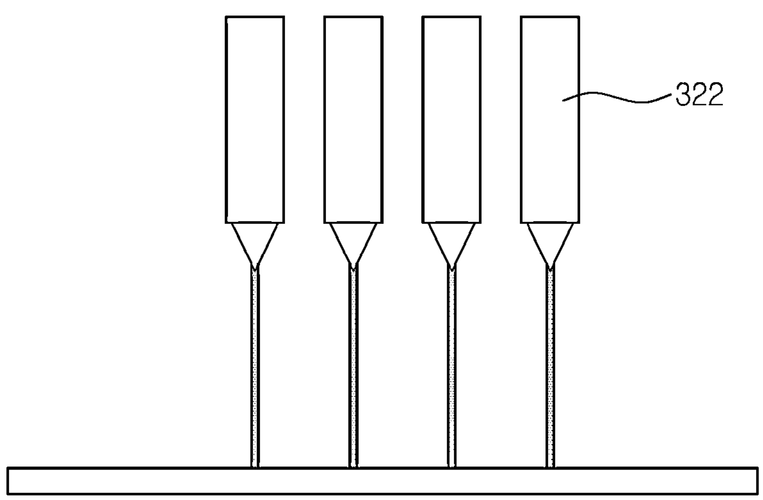
FIG. 15 is a view illustrating how side surface wiring printing is performed by multiple nozzles according to the present disclosure.
Figure 16A:
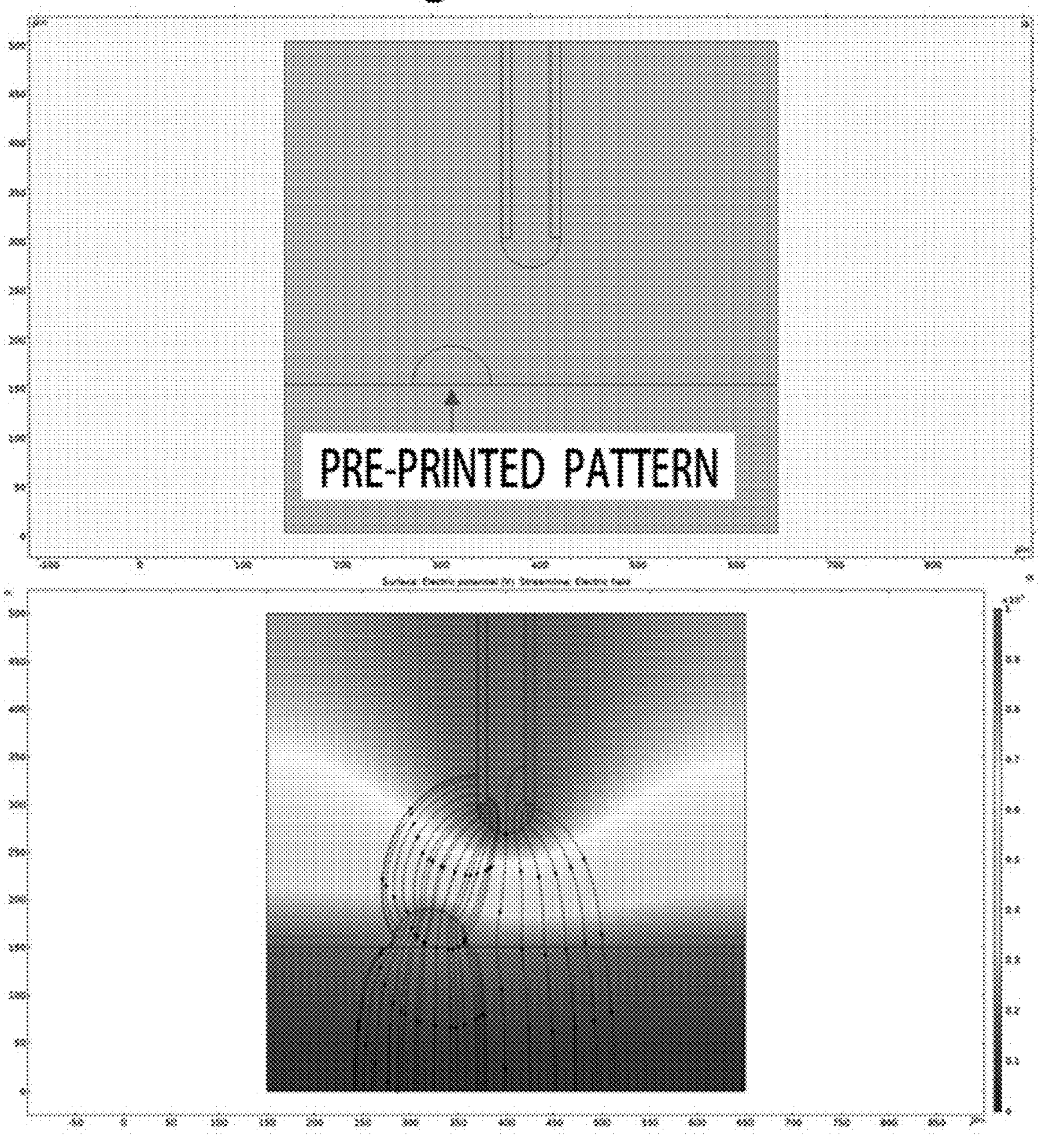
FIGS. 16A and 16B illustrate a result of simulating electric field distribution when side surface wiring printing is performed using a single nozzle and multiple nozzles.
Figure 16B:
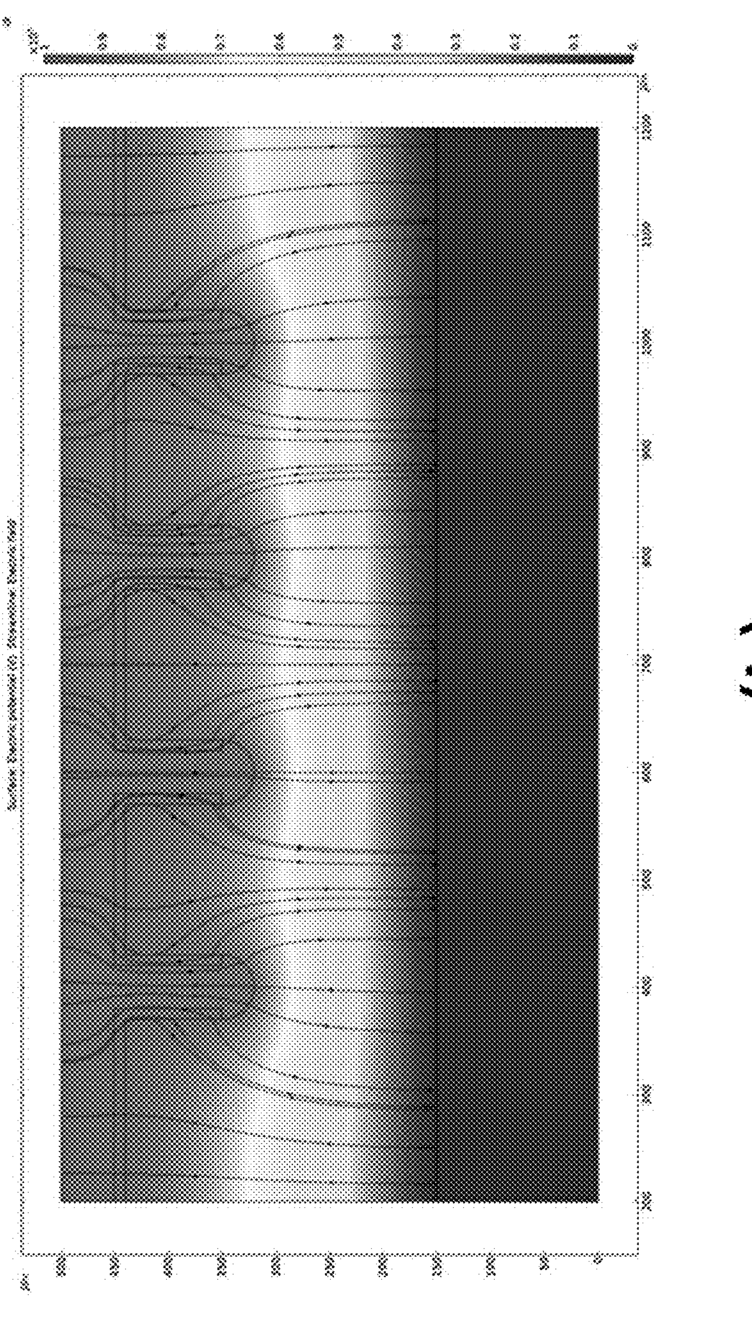
Figure 17:
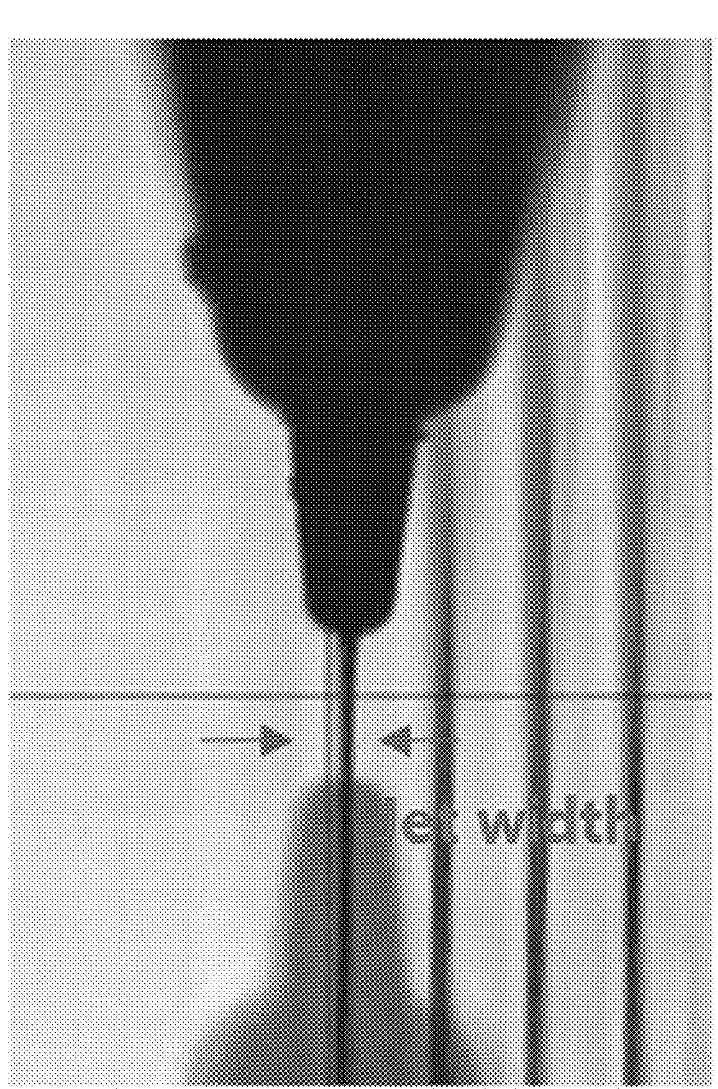
FIG. 17 illustrates an example of an image photographed by an imaging part.
Figure 18:
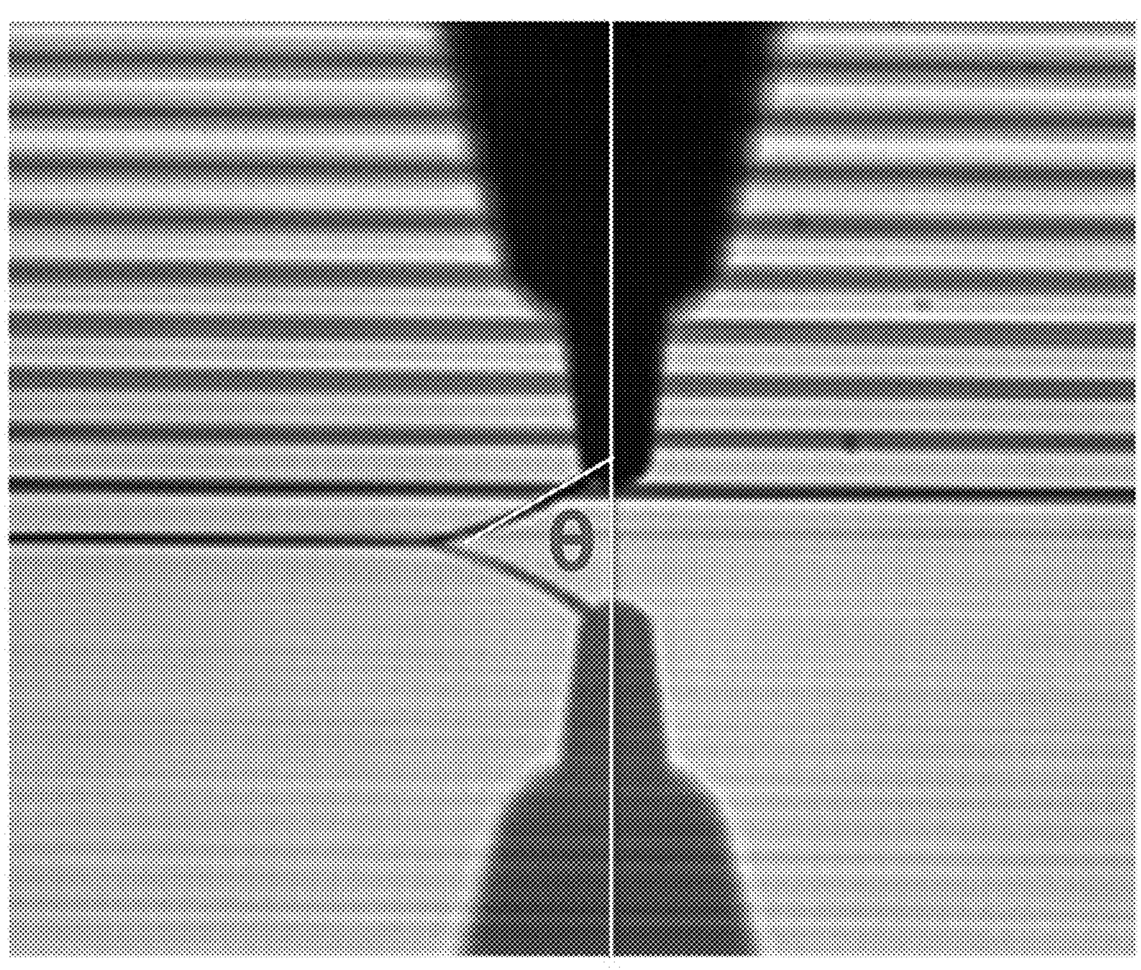
FIG. 18 is a view describing an ejecting angle as an example of an image photographed by an imaging part.
Figure 19A:
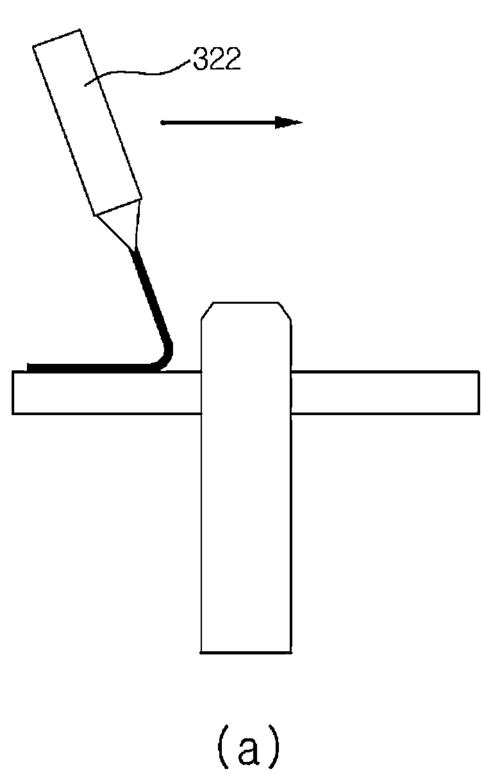
FIGS. 19A and 19B are views describing an operation where an angle of a nozzle is altered by a nozzle angle alteration part and printing is performed.
Figure 19B:
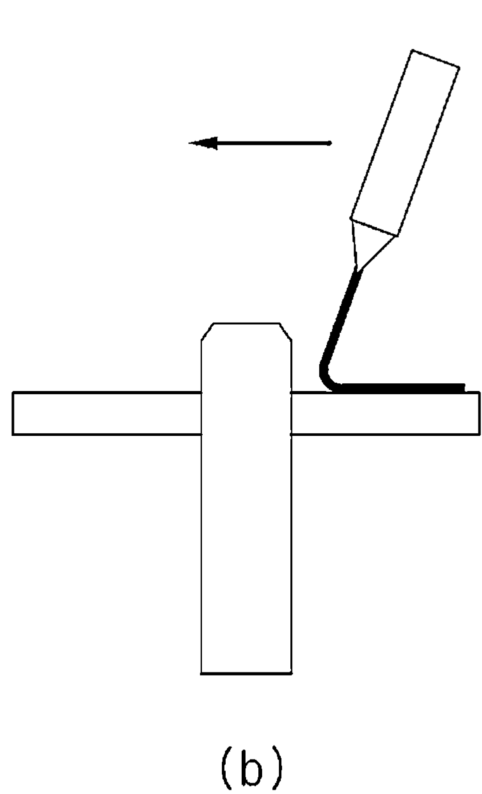

FIG. 9 is a schematic configurative view of a 3D surface printing apparatus for edge area of the substrate according to an embodiment of the present disclosure, FIG. 10 is a view illustrating how ink is being ejected from an EHD jetting nozzle of the present disclosure, FIGS. 11A and 11B are views illustrating a process of printing a 3D surface connecting a rim upper and lower surface and side surface of the substrate using the 3D surface printing apparatus for edge area of the substrate of FIG. 9, FIG. 12 illustrates a pattern printed on a rim at one side of the substrate and a side surface of the substrate according to the present disclosure, FIG. 13 illustrates a printing result according to the speed of a transfer part, FIG. 14 is a view describing the effect that a pre-printed pattern has on side surface wiring printing, FIG. 15 is a view illustrating how side surface wiring printing is performed by multiple nozzles according to the present disclosure, FIGS. 16A and 16B illustrate a result of simulating electric field distribution when side surface wiring printing is performed using a single nozzle and multiple nozzles, FIG. 17 illustrates an example of an image photographed by an imaging part, FIG. 18 is a view describing an ejecting angle as an example of an image photographed by an imaging part, and FIGS. 19A and 19B are views describing an operation where an angle of a nozzle is altered by a nozzle angle alteration part and printing is performed.

A 3D surface printing apparatus for edge area of the substrate according to an embodiment of the present disclosure may include a jig part 310, a nozzle part 320, a moving part 330, an imaging part 340 and a control part 350.

A 3D surface printing apparatus for edge area of the substrate according to the present disclosure as mentioned above prints a pattern of fine width that is continuously connected along a front surface of a rim of the substrate, a rear surface of the rim of the substrate, and a side surface between the front surface and the rear surface that are the edge area of the substrate 112. For example, when printing a masking pattern 182 for a side surface wiring 120 of a display module 10 consisting of a micro LED 150 as mentioned above, a 3D surface printing apparatus for edge area of the substrate of the present disclosure may be used.

The jig part 310 supports both sides of the substrate 112 and erects and immobilizes the substrate 112. Here, a first jig 310*a* at the left side may support the front surface of the substrate 112, and a second jig 310*b* at the right side may pressurize the rear surface of the substrate 112 with a predetermined force and support the same.

As mentioned above, the substrate 112 may not only be a glass substrate, silicon substrate but also a substrate of a plastic material including a flexible substrate. Further, the substrate 112 may be a substrate where plastic and glass are formed in a multiple layer form.

The first and second jig 310*a*, 310*b* is disposed such that it is moveable along a left right horizontal direction according to a control signal of the control part 250, and the first and second jig 310*a*, 310*b* clamp or de-clamp the substate 112. Here, when the substrate 112 is being erected and immobilized by the jig part 310, a rim at an upper side of the substrate 112 may be made to protrude above the first and second jig 310*a*, 310*b* so that a protruded edge area may be printed.

The nozzle part 320 may be composed to include a nozzle 322 that ejects ink through EHD jetting above the substrate 112 erected by the jig part 310, an electrode 323 for forming an electric field for the EHD jetting, a high voltage controller that applies a high voltage to the electrode 323 for the EHD jetting, a pneumatic controller 326 that controls a pneumatic inside the nozzle 322, and a syringe pump 327 that supplies ink to inside of the nozzle 322. Further, the nozzle part 320 may further include a nozzle angle alteration part 324.

Referring to FIG. 10, ink of a straight jet flow section J1 and a spinning jet flow section J2 may be printed on the substrate 112 according to a spaced interval between the substrate 112 and the nozzle 322 when ink is being ejected from the nozzle 322. The straight jet flow section J1 means the ink ejected from the nozzle 322 flowing along a straight line direction that is vertical to the substrate 112, and the spinning jet flow section J2 means the ink flowing in a spiral or cone shape below the straight jet flow section. For reference, in FIG. 10, the spinning jet flow section is illustrated to be somewhat exaggerated for purpose of description.

In the present disclosure, the masking pattern 182 may be formed mainly by the straight jet flow section J1. However, when the line width of the masking pattern 182 needs to be widened further, it may be formed by the spinning jet flow section J2.

In the nozzle part 320, the electrode 323 that forms an electric field for the EHD jetting may be formed inside or outside of the nozzle.

In addition, the high voltage controller 325 applies a high voltage to the electrode 323 to form an electric field around the nozzle 322, and allows ink to be ejected from the nozzle 322 with the force of the electric field.

Moreover, the pneumatic controller 326 controls the pneumatic inside the nozzle 322 to provide force for ink to be ejected from the nozzle 322 and to control the flow rate of ink being ejected from the nozzle 322.

Moreover, the syringe pump 327 supplies the ink stored in the ink storage tank that is not illustrated, to inside of the nozzle 322. Here, by controlling the amount of the ink being supplied from the syringe pump 327, the flow rate of the ink being ejected may be controlled.

The moving part 330 moves the nozzle 322 disposed above the erected substrate 112 to left and right at a predetermined speed around the substrate 112. Here, in the process of moving to left and right, the acceleration may change. The nozzle 322 may be set to maintain a predetermined spaced distance with the side surface of the substrate 112 such that, when the nozzle 322 makes a straight line reciprocal movement horizontally, the lowest end of the nozzle 322 is not interrupted to the side surface of the substrate 112.

When the nozzle 322 is moved to left or right direction while ejecting ink from the nozzle 322, gravity, force due to the electric field, and inertial force act together on the ejected ink, and the ink can be printed on the substrate 112. When the nozzle 322 is being moved by the moving part 330, a lower end of the ink being ejected may be bent to the moving direction or opposite direction by the inertial force. Here, when the ink approaches to one side surface of the substrate 112, a large force due to the electric field acts so that the ink moves towards the substrate 112, and the ink ejected from the nozzle 322 and extending at length may be printed on one side surface of the opposing substrate 112 in the form of a straight line. Here, after the nozzle 322 passed by from one side to the other side of the substrate 112 and the nozzle is moved to the opposite direction again, the ink may be printed in the form of a straight line on the other side surface of the substrate 112 in the same principle.

Referring to FIGS. 11A and 11B, in the case of forming the masking pattern 182 mentioned above, the substrate 112 is erected vertically and immobilized by the jig part 310, and the edge area of the substrate 112 being printed at this time is exposed and immobilized.

At this state, as illustrated in FIG. 11A, when the nozzle 322 is moved from left to right direction around the substrate 112 and ink is ejected, the ink may be printed from above the first jig 310*a* via the substrate 112 to above the second jig 310*b*. Here, the ink may be printed on one side surface of the substrate 112 in the direction opposite to the direction of movement of the nozzle 322 as mentioned above, but on the other side surface of the substrate 112, the ink may not be printed. Thus, when the nozzle 322 is moved in the opposite direction (from right to left direction) as in FIG. 11B, the ink may be printed on the other side surface of the substrate 112 as well, and the masking pattern 182 that is connected to the edge area may be formed.

The masking pattern 182 by the EHD jet printing has a thin line width (for example, a line width of 5 μm to 15 μm), but when printing is performed while repeating the straight line reciprocating movement of the nozzle 322, it is possible to have a thick printing thickness while maintaining a thin line width by lamination.

FIG. 12 illustrates a pattern actually printed according to the present disclosure. The drawing at the left side illustrates a result printed on the side surface of the substrate 112, and the drawing at the right side illustrates a result printed on a rim at one side of the substrate 112.

The distribution of the electric field generated by applying a high voltage to the electrode 323 is formed in a vertical direction above a surface of a 3D structure (edge area of the substrate 112) from the nozzle 322, and the ink induced and ejected by a potential difference of the nozzle 322 and the substrate 112 surface can move under the influence of the electric field distribution. Here, to the jet ejected while moving the nozzle 322 left and right by the moving part 330, an inertial force acts in the moving direction. Here, by the force of the electric field and the inertial force, a pattern with straightness can be formed on a 3D surface. Here, the inertial force may be determined by mass and acceleration, and as illustrated in FIG. 13, the faster the left right movement speed of the nozzle 322, the better the straightness of the pattern. For reference, the left side of FIG. 13 illustrates a printing result when the movement speed of the nozzle during printing is set to 20 mm/s, and the right side of FIG.

13 illustrates a printing result when the movement speed of the nozzle during printing is set to 50 mm/s.

As such, a 3D surface printing apparatus for edge area of the substrate 112 according to the present disclosure does not perform printing regarding the edge area of the substrate 112 having a 3D shape while moving the nozzle 322 along a surface of the substrate 112 by a driving part that drives the nozzle by six axes as in an existing 3D printing apparatus, but can perform printing regarding a 3D surface that is an edge area of the substrate 112 with only the configuration of the moving part 330 that moves left and right horizontally. Therefore, since it is possible to print a 3D surface with one axis driving of moving the nozzle 322 left and right reciprocally, there is an advantage of simple device configuration and simple control.

Further, the moving part 330 may move the nozzle in an up and down direction that is a horizontal direction to the substrate 112. Therefore, when performing printing while moving in left and right directions around the substrate 112, the moving part 330 may move the substrate 112 in an up and down direction as well to control such that a vertical distance between a distal end of the nozzle 322 and an upper end of the substrate 112 is changed, when performing printing.

The nozzle angle alteration part 324 alters an angle of the nozzle 322. The nozzle angle alteration part 324 may be controlled by the control part 350. As illustrated in FIGS. 19A and 19B, when performing printing on the edge area of the substrate 112 while moving the nozzle left and right by the moving part 330, the angle of the nozzle 322 may be altered according to the moving direction of the nozzle 322 by the nozzle angle alteration part 324.

When moving the nozzle 322 towards the substrate 112 by the moving part 330, it is desirable that the nozzle angle alteration part 324 alters the angle of the nozzle 322 such that the nozzle 322 heads towards the substrate 112. For example, as in FIG. 19A, in a case where the nozzle 322 moves towards the substrate 112 from left to right, the nozzle 322 may be rotated counterclockwise so that the nozzle 322 heads towards the substrate 112, and as in FIG. 19B, in a case where the nozzle 322 moves towards the substrate 112 from right to left, the nozzle 322 may be rotated clockwise so that the nozzle 322 heads towards the substrate 112, thereby performing printing more easily on the substrate 112 surface opposing the moving direction of the nozzle 322.

In addition, although not illustrated, a substrate angle alteration part that alters an arrangement angle of the substrate may be further included. Likewise, when moving the nozzle 322 towards the substrate 112 by the moving part 330, the substrate angle alteration part may alter the angle of the substrate 112 such that the substrate 112 surface being printed heads towards the nozzle 322, thereby performing printing more easily on the substrate 112 surface opposing the moving direction of the nozzle 322.

The drawings show forming the masking pattern 182 regarding a single substrate 112, but a plurality of substrates 112 may be erected and arranged in parallel and a spacer (not illustrated) may be arranged between adjacent substrates 112, such that an edge area is spaced apart and protruded regarding the plurality of substrates 112, and in a case of performing printing while moving the nozzle left and right above the plurality of substrates 112 as mentioned above, it is possible to perform printing on the edge area at the same time regarding the plurality of substrates 112. Here, the spacer may be arranged between each substrate 112, and the first jig 310*a* and the second jig 310*b* may pressurize regarding the substrates 112 at both sides of the outermost part to erect and immobilize the plurality of substrates 112.

The imaging part 340 photographs an image of the ink being ejected from the nozzle 322. The imaging part 340 may be a digital camera, and the image photographed by the imaging part 340 may be transmitted to the control part 350, and the control part 350 may obtain the line width (diameter) or ejecting angle of the ink being ejected based on the image, through image analysis.

Here, the ink ejected from the nozzle 322 being bent with an ejecting angle is caused by the inertial force due to a left right direction movement of the nozzle 322, and thus in order to obtain an accurate ejecting angle, it is desirable to be arranged in a location where the left right movement of the nozzle can be photographed on the front surface of the nozzle 322. For reference, in FIG. 9, the imaging part 340 is shown in a location different from the described location, in order to inhibit the imaging part 340 from overlapping with other elements.

In addition, the imaging part 340 may photograph a line patterned on the substrate 112. Therefore, in the present disclosure, the imaging part 340 may be formed as a plurality of cameras including one that photographs an image of the ink being ejected from the nozzle 322 and another that photographs the line patterned on the substrate 112 (only one is shown in the drawings).

The control part 350 controls an entire printing operation. The control part 350 may control operations of the jig part 310, the moving part 330, the high voltage controller 325, the pneumatic controller 326 and the syringe pump 327.

When forming a pattern under certain printing conditions (for example, size of the voltage being applied to the electrode 323, moving speed of the nozzle 322), as printing proceeds as illustrated in FIG. 14, the electric field distribution is affected by a pre-printed pattern, allowing the ink ejected from the nozzle 322 to bend towards the direction of the pre-printed pattern. Therefore, when performing printing under the same printing condition, the next pattern cannot be printed on the exact location. Thus, in the present disclosure, printing is performed while the control part 350 controls the printing conditions differently in consideration of the effect that the pre-printed pattern has on the electric field distribution as the printing proceeds.

Here, in the present disclosure, the control part 350 may control the printing operation in consideration of changes in the 3D electric field distribution caused by changes of shape and material of the structure surrounding the area being printed including the nozzle 322, the substrate and the imaging part 340 while the nozzle 322 is moved and printing proceeds. Here, since and shape and material of the structures may be changed by the pre-printed pattern, the 3D electric field distribution may also change due to the pre-printed pattern.

Thus, according to the present disclosure, changes in the 3D electric field distribution caused by changes of shape and material of the structures surrounding the area being printed and the pre-printed pattern as the printing proceeds can be obtained through simulation using computer, and based on this, printing is performed under different printing conditions. It is possible to accumulate printing results according to spray environment information regarding the shape and material of structures and printing conditions in a database, and build a printing prediction model for predicting an actual printing result (location or line width, etc.) depending on the spray environment information and printing conditions using machine learning methods, and when the 3D electric field distribution changes according to the spray environment information, the control part 350 may control the printing operation in real time using the printing conditions provided by the printing prediction model.

When obtaining the changes in the 3D electric field distribution as printing proceeds through simulation, changes in the surrounding environment such as temperature or humidity may be additionally considered, and changes in the 3D electric field distribution caused by changes in the voltage being applied to the electrode may be considered.

Thus, according to the present disclosure, in order to minimize the effect caused by a pre-printed pattern, it is possible to perform printing while controlling voltages being applied to the electrode 323 differently from one another so as to control the electric field distribution between the nozzle 322 and the edge area as printing proceeds. Further, in order to minimize the effect caused by the pre-printed pattern, it is possible to perform printing while controlling flow rate of the ink being ejected from the nozzle 322 differently. The flow rate of the ink being ejected from the nozzle 322 may be controlled by adjusting the pneumatic being supplied to the inside of the nozzle 322 by the pneumatic controller 326. Further, it is possible to control the flow rate of the ink being supplied to the inside of the nozzle 322 by the syringe pump 327, thereby controlling the flow rate of the ink being ejected from the nozzle 322.

It is possible to eject the ink in a straight line form from the nozzle 322 while minimizing the effects of the electric field changes caused by the pre-printed pattern by controlling the voltage being applied to the electrode 323 and the flow rate of the ink being ejected from the nozzle 322.

Moreover, in order to minimize the effect caused by the pre-printed pattern, printing may be performed while controlling the moving speed of the nozzle 322.

Moreover, in a case of forming a plurality of patterns through multiple nozzles 322 arranged in a row as illustrated in FIG. 15, the effect caused by the pre-printed pattern may be removed.

FIGS. 16A and 16B illustrate a result of simulating the effect that a pre-printed pattern has on electric field distribution. It can be seen that in a case where there is a pre-printed pattern as illustrated in FIG. 16A, the electric field distribution between the nozzle 322 and the edge area is not left-right symmetrical, and electric field concentration occurs to where the pattern is formed. On the contrary, it can be seen that in a case of forming a pattern using multiple nozzles 322 as illustrated in FIG. 16B, the electric field distribution is formed left-right symmetrically, and thus the ink ejected from the multiple nozzles 322 can be ejected in a straight line direction without being bent.

Further, in order to secure straightness of pattern and uniformity of line width of the pattern, as in FIG. 17, the control part 350 may receive an image that the imaging part 340 photographed and measure the diameter (width) of the ink being ejected, based on the received image, and control the diameter of the ink being ejected in real time depending on the measured diameter, and perform printing. That is, in a case where there are changes in the diameter of the ink being ejected in the middle of printing, the diameter of the ink being ejected may be controlled in real time, so that the ink can be ejected at a certain width again.

The line width of the pattern being printed on the substrate 112 may be determined by the diameter of the ink jet being ejected from the nozzle 322. Therefore, according to the present disclosure, it is possible to control the line width being printed while controlling the diameter of the ink jet being ejected from the nozzle 322, in real time.

In order to control the diameter of the ink jet, in the process of performing printing while moving the nozzle 322 left and right, it is possible to change the vertical distance between the nozzle 322 and the substrate 112, change the size of the voltage being applied to the electrode 323 for the EHD jetting, or control the flow rate of the ink being ejected from the nozzle 322 or control the ejecting angle.

Here, an up and down moving part 332 that moves the nozzle 322 up and down to change the vertical distance between the nozzle 322 and the substrate 112 may be further provided.

In addition, the flow rate of the ink being ejected from the nozzle 322 may be controlled by adjusting the pneumatic being supplied to the inside of the nozzle 322 by the pneumatic controller 326. Otherwise, the flow rate of the ink being ejected from the nozzle 322 may be controlled by controlling the flow rate of the ink being supplied to the inside of the nozzle 322 by the syringe pump 327.

When ink is being ejected from the nozzle 322, it may be divided into a straight line jet flow section J1 and a spinning jet flow section J2 as illustrated in FIG. 10, and the width of the ink may differ even within each section depending on the location. Therefore, it is possible to control the line width being printed, by changing the vertical distance between the nozzle 322 and the substrate 112 such that a point having the corresponding width is printed on the substrate 112.

As such, based on the image photographed by the imaging part 340, in a case where the width of the ink being ejected is thicker than previously, the control part 350 may control the width of the ink being ejected in real time to be thin again as previously, by controlling the up and down moving part 332, high voltage controller 325, pneumatic controller 326, syringe pump 327 and the like in the method mentioned above. On the contrary, based on the image photographed by the imaging part 340, in a case where the width of the ink being ejected is thinner than previously, the control part 350 may control the line width in real time to be thick again as previously, by controlling the up and down moving part 332, high voltage controller 325, pneumatic controller 326, syringe pump 327 and the like in the method mentioned above.

In addition, as in FIG. 18, the control part 350 allows printing to be performed while measuring the ejecting angle of the ink being ejected based on the image photographed by the imaging part 340 and controlling the ejecting angle in real time.

The ejecting angle means an angle bent based on vertically below the nozzle by the inertial force and the force of the electric field as illustrated in FIG. 18.

Here, in order to control the ejecting angle, the control part 350 may change the horizontal moving speed (change of inertial force) of the nozzle 322, change the vertical distance between the nozzle 322 and the substrate 112, change the size of the voltage being applied to the electrode 323 for the EHD jetting, or control the flow rate of the ink being ejected from the nozzle 322.

For example, if the moving speed of the nozzle 322 is faster, the inertial force can be greater and the ejecting angle can be greater. Further, by controlling the size of the electric field, it is possible to control the size of the force that the ink heads toward the substrate 112 caused by the electric field, and thus the ejecting angle can be controlled. Here, it is possible to secure the straightness of the pattern being printed when the ejecting angle is 20 degrees or more.

As such, the control part 350 may identify the ejecting angle from the image photographed by the imaging part 340, and control the moving part 330, up and down moving part 332, pneumatic controller 325, pneumatic controller 326 and the like, to control the ejecting angle of the ink in real time, thereby secure the uniformity of printing result.

As mentioned above, the imaging part may photograph a line patterned on the substrate 112. Here, the control part 350 may obtain the line width of the patterned line from the image photographed by the imaging part and store the printing conditions regarding the line width and the information of the line width. Here, it is possible to identify changes in the line width of the line patterned on the substrate 112 in real time and predict the diameter of the ink being ejected from the nozzle 322, and based on this, it is possible to control the printing condition so that the ink being ejected has a certain diameter.

The control part 350 may predict the diameter of the ink being ejected from the nozzle 322 from information of line width of the line patterned on the same substrate 112. Otherwise, the diameter of the ink being ejected may be predicted from information of line width of the patterned line stored regarding a plurality of substrates 112 in repetitive printing processes and data of the corresponding printing information.

In the embodiment mentioned above with reference to FIGS. 9 to 19B, description was made based on an example where the substrate 112 is erected and immobilized by the jig part 310, and printing is performed while moving the nozzle 322 left and right from above the substrate 112, but this may be modified and implemented as a structure where the substrate 112 is arranged horizontally such that a rim of the substrate 112 is exposed, and the nozzle 322 is arranged horizontally at one side of the rim of the substrate 112, and at this state, printing is performed while moving the nozzle 322 in both directions in up and down direction which is a normal vector direction of the substrate around the rim of the substrate 112.

Figure 20:
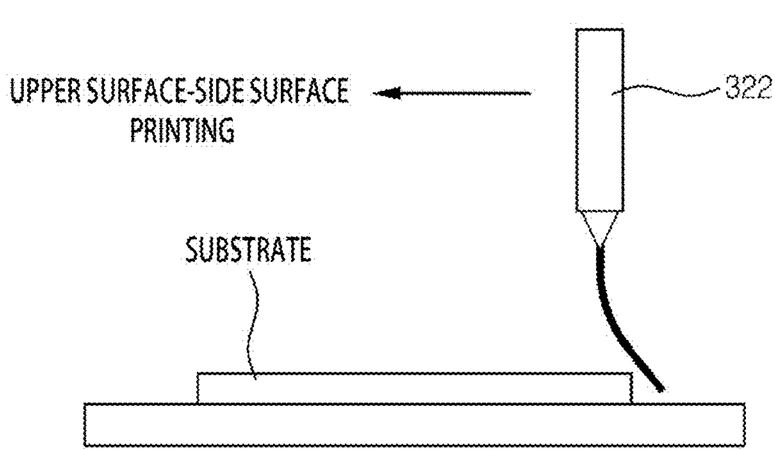
FIG. 20 illustrates a printing operation using a 3D surface printing apparatus for edge area of the substrate according to another embodiment of the present disclosure.
Figure 20:
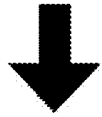
Figure 20:
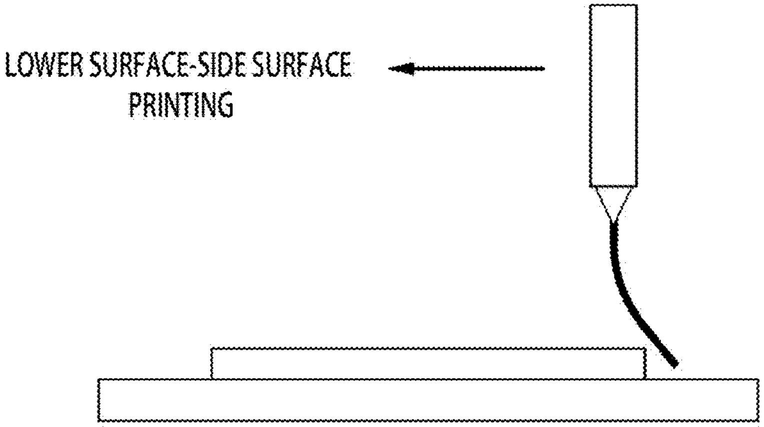

FIG. 20 illustrates a printing operation using a 3D surface printing apparatus for edge area of the substrate according to another embodiment of the present disclosure.

In the description hereinbelow, description will be made mainly based on the difference from the embodiment mentioned above with reference to FIGS. 9 to 19B.

In the embodiment mentioned above, the jig part 310 that erects and immobilizes the substrate 112 is provided, but in the present embodiment, printing is performed with the substrate 112 seated on top of a stage just as in general printing apparatuses. Configurations of the nozzle part 320, moving part 330, control part 350, imaging part 340, pneumatic controller 326, syringe pump 327 and the like are the same.

As illustrated, in the present embodiment, it is possible to print a pattern where a side surface of the substrate 112 and a rim on an upper surface of the substrate 112 located in the moving direction of the nozzle 322 are continuously connected while moving the nozzle 322 in one direction (from right to left in the drawings) regarding the substrate 112 seated on top of the stage. Then, it is possible to turn over the substrate 112 so that the opposite lower surface of the substrate 112 is placed below the nozzle 322 and align the substrate 112, and then print a pattern where the side surface of the substrate 112 and the rim on the lower surface of the substrate 112 located in the moving direction of the nozzle 322 is connected while moving the nozzle 322 in one direction in the same method. By performing printing regarding the upper surface and the lower surface of the substrate 112 in this way, it is possible to print a pattern where the rim on the upper surface of the substrate 112, side surface of the substrate 112, and the rim on the lower surface of the substrate 112 are continuously connected.

In a case of performing printing with the substrate 112 erected by the jig part 310 as mentioned above, it is possible to print the rim on the upper surface of the substrate 112, the side surface of the substrate 112, and the rim on the lower surface of the substrate 112 all at once, but it is not easy to adjust the length of the pattern formed on the upper and lower surface of the substrate 112. On the other hand, in a case of performing printing with the substrate 112 reversed upside down as in the present embodiment, although there is a disadvantage in that the substrate 112 turned over and the upper surface and the lower surface are each separately printed, since it is possible to adjust the length of the pattern formed on the upper and lower surface of the substrate 112 depending on the distance the nozzle is moved horizontally, there is an advantage that the length of the pattern of the upper and lower surface of the substrate 112 can be easily adjusted.

Next, characteristics of the ink that may be used by a 3D surface printing apparatus of the present disclosure will be described.

Figure 21:
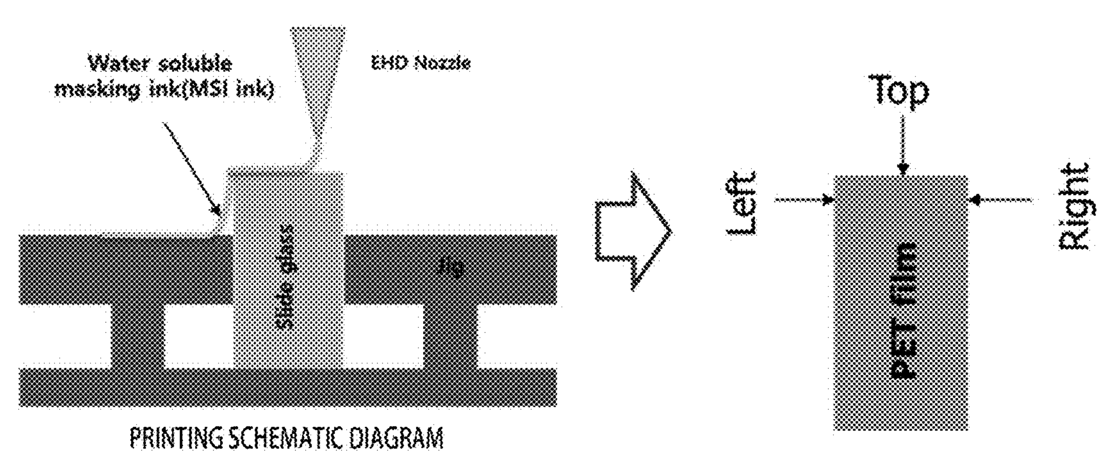
FIG. 21 illustrates a printing result using ink according to Example 1.
Figure 21:
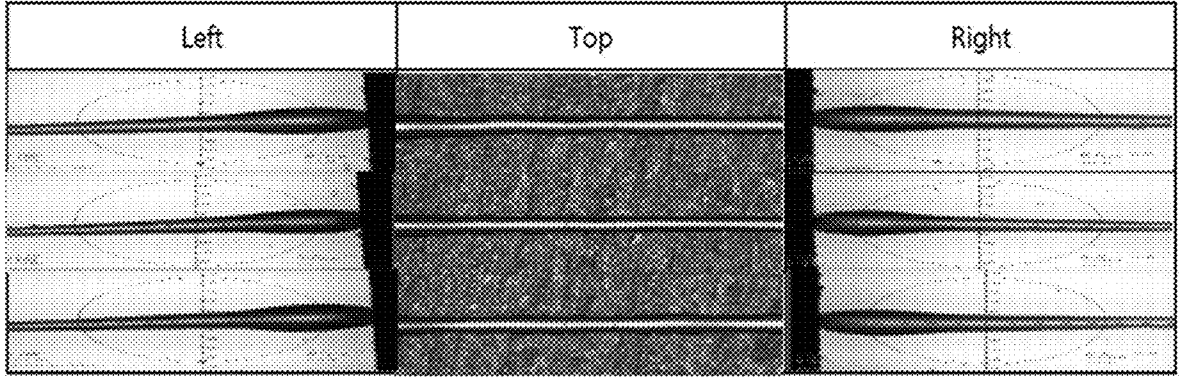
Figure 22:
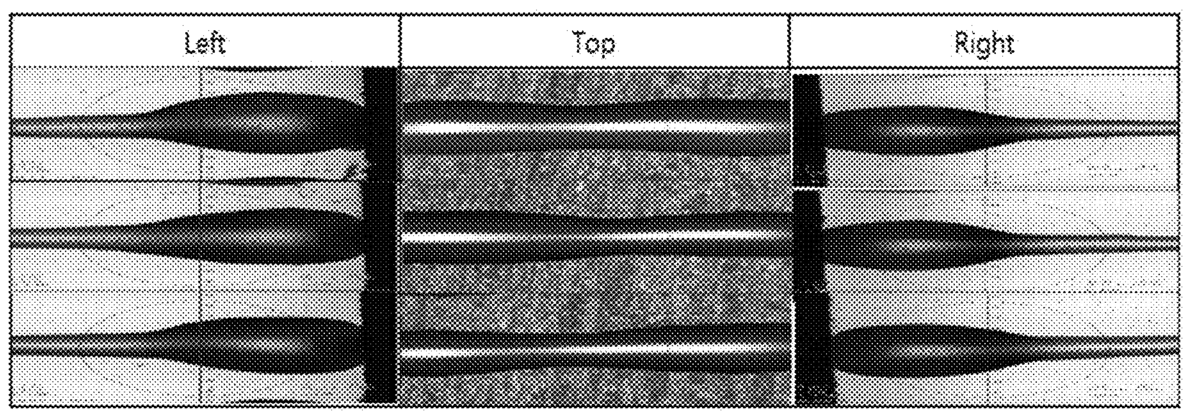
FIG. 22 illustrates a printing result using ink according to Example 2.
Figure 23:
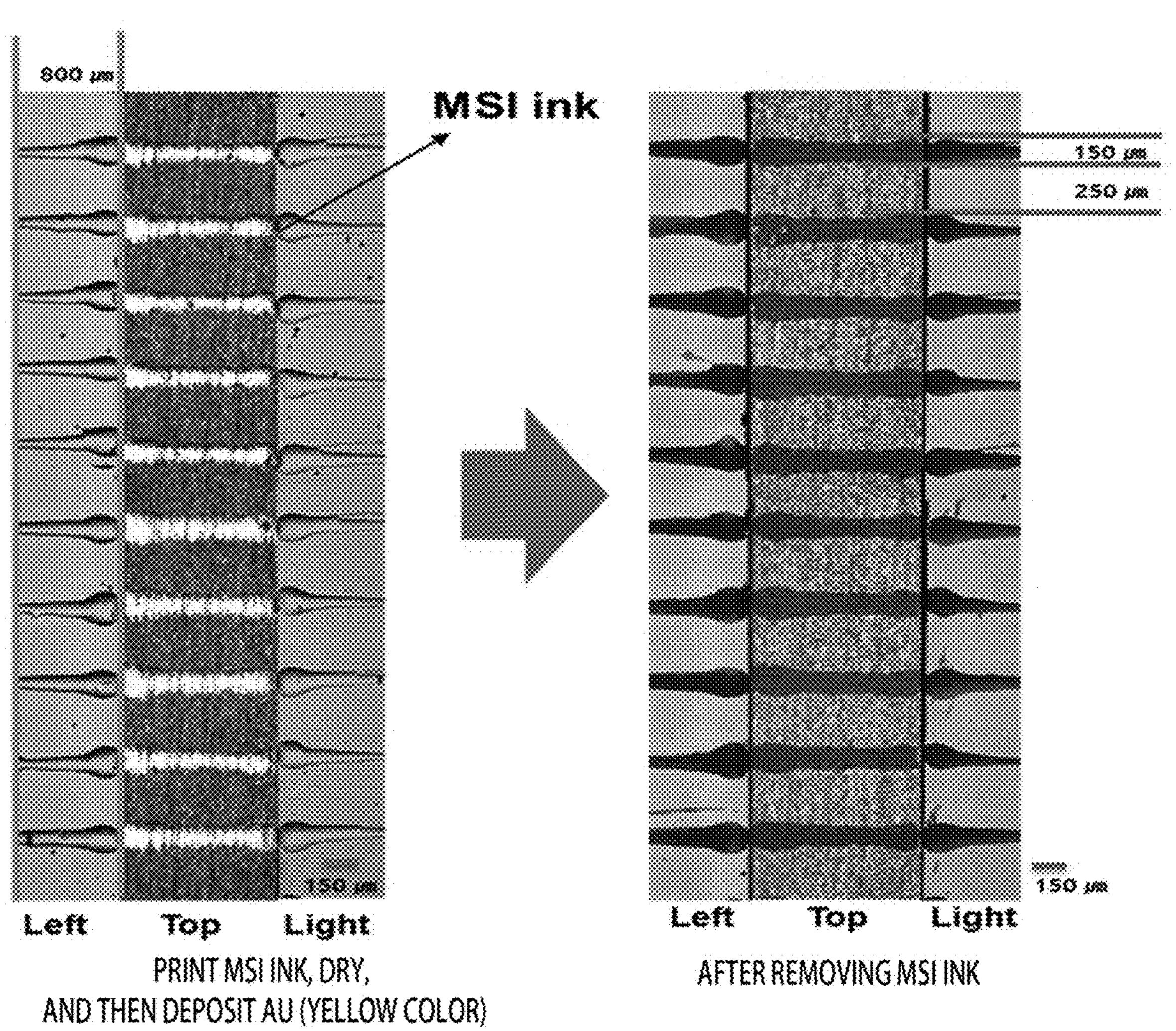
FIG. 23 illustrates a result of forming a masking pattern using ink and forming a side surface wiring according to Example 1.
Figure 24:
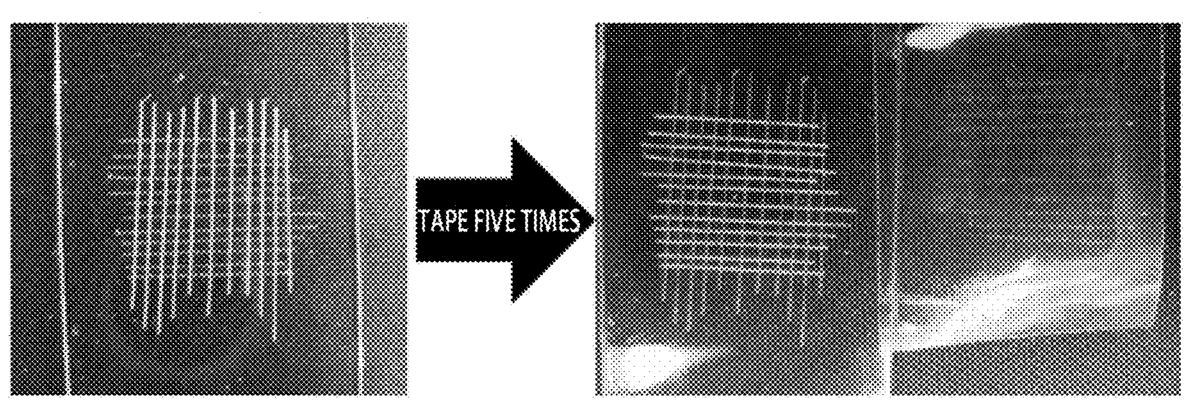
FIG. 24 illustrates a result of evaluating adhesion force after applying ink on top of a PET film according to Example 1.
Figure 25:
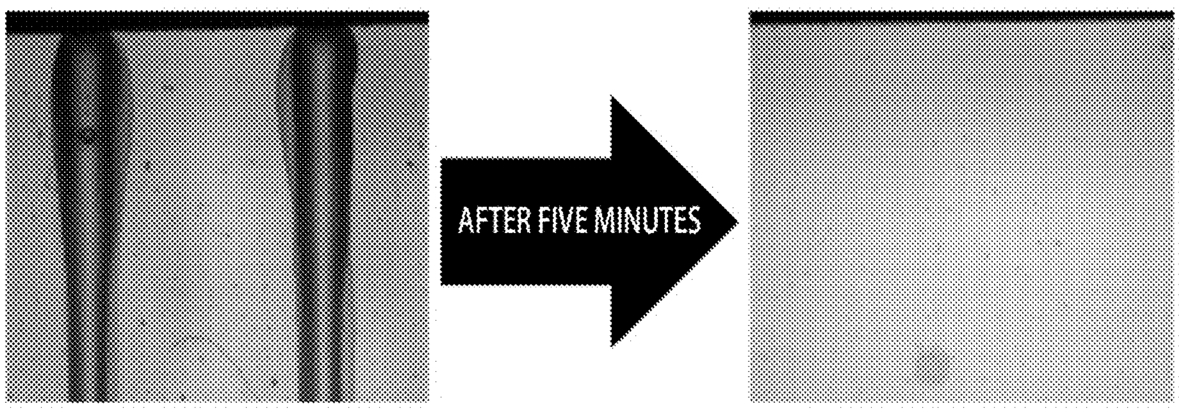
FIG. 25 illustrates a result of evaluating peeling characteristics of ink according to Example 1.
Figure 26:
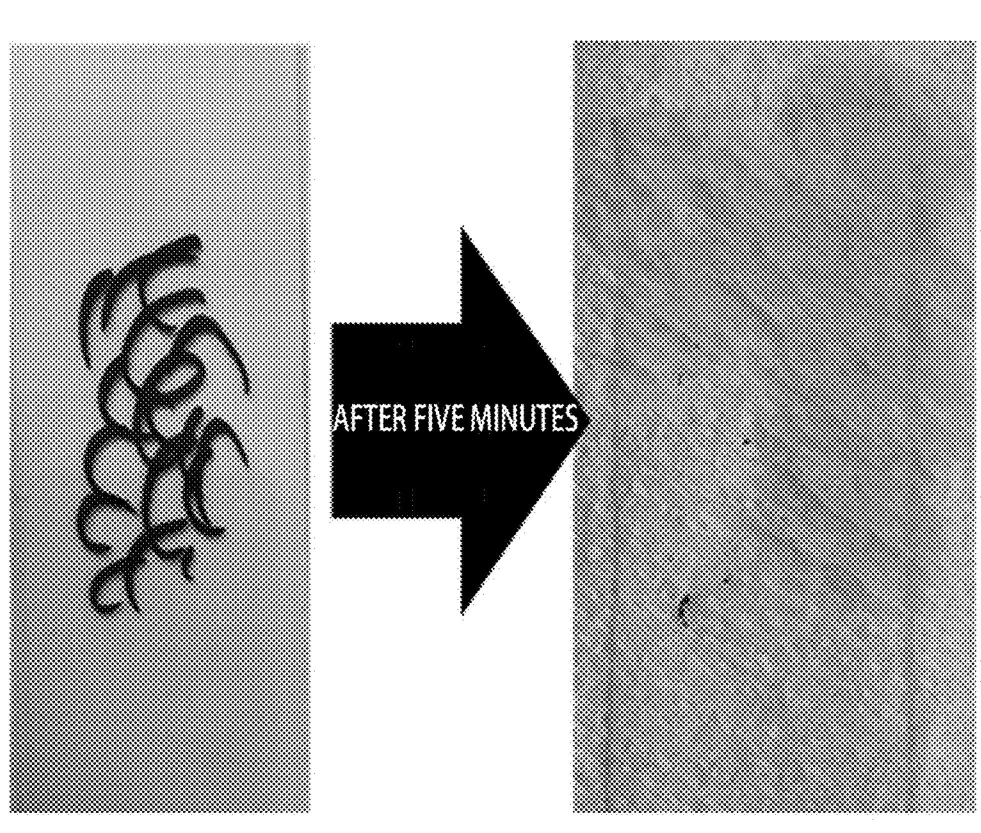
FIG. 26 illustrates a result of evaluating a name pen removal power of ink according to Example 1.
Figure 27:
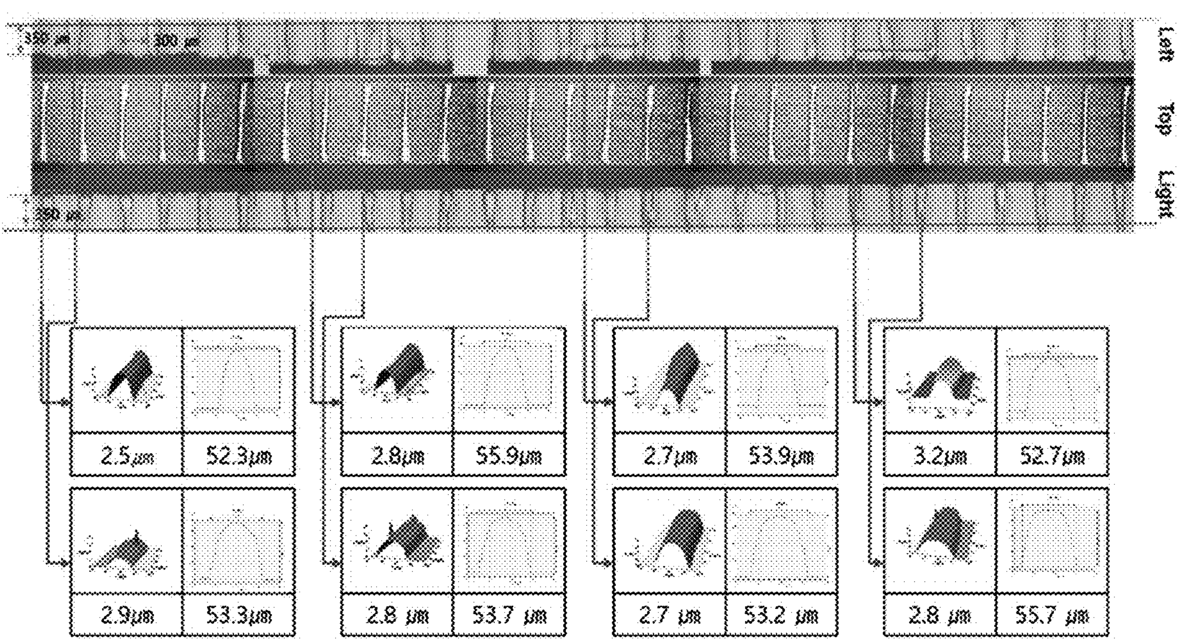
FIG. 27 illustrates a printing result using ink according to Example 3.
Figure 28:
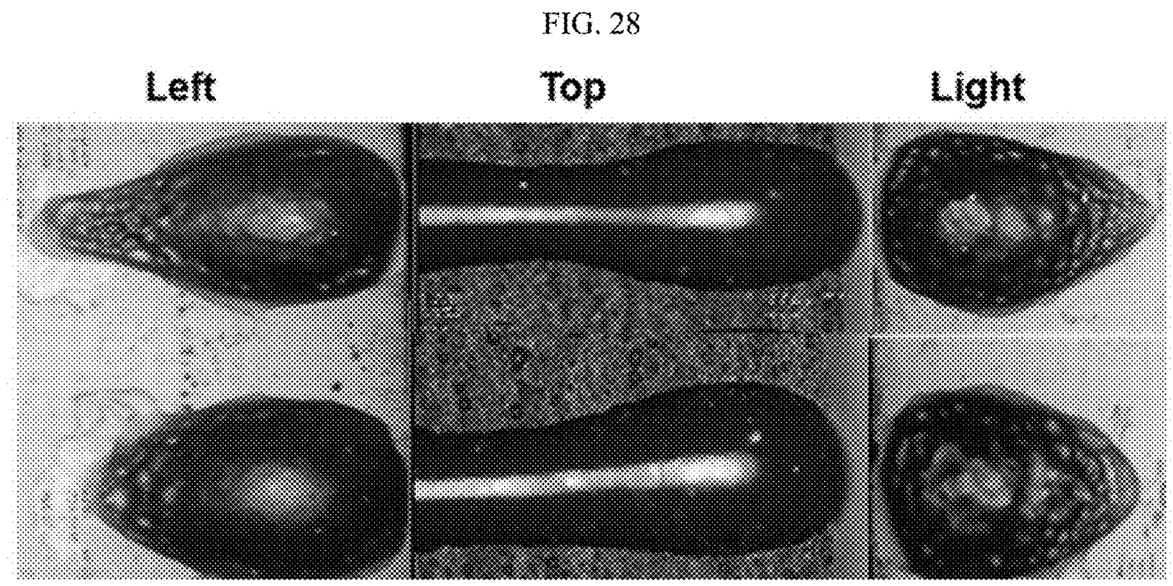
FIG. 28 illustrates a printing result using ink according to Example 4.
Figure 29:
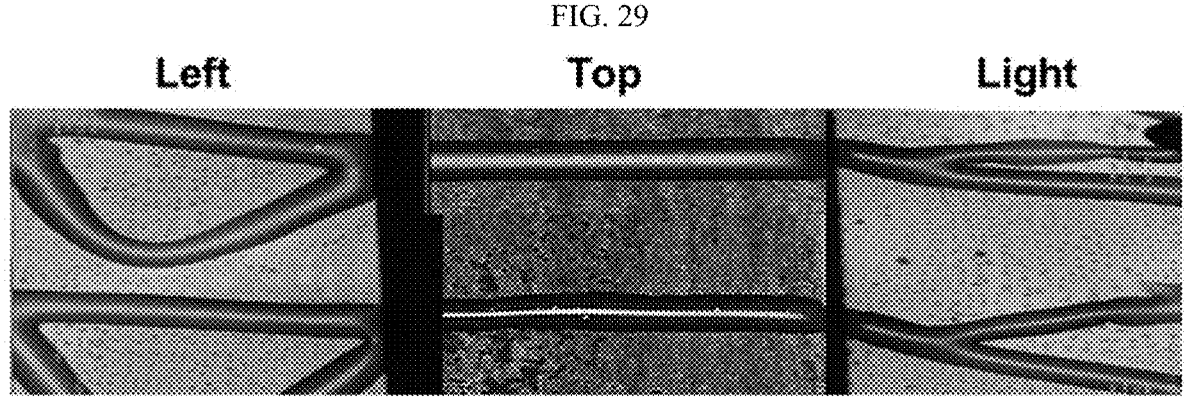
FIG. 29 illustrates a printing result using ink according to Example 5.
Figure 30:
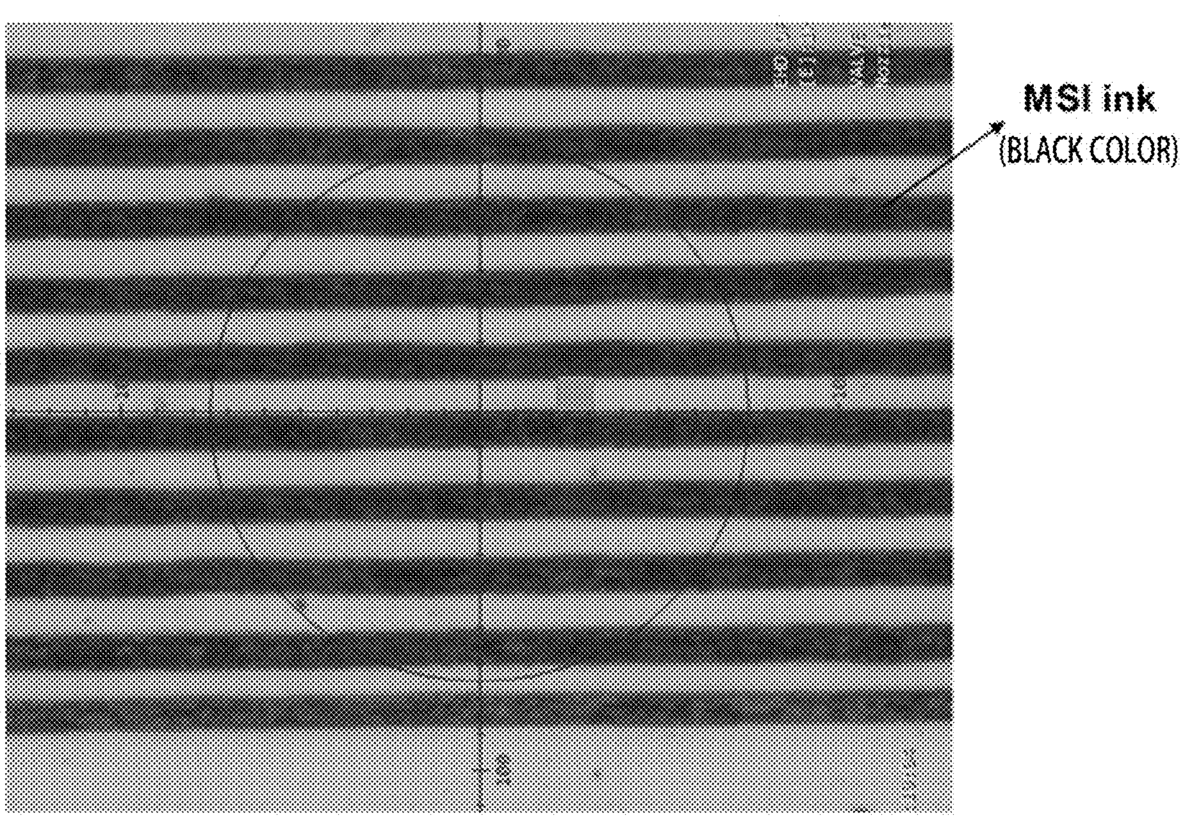
FIG. 30 illustrates a printing result using ink according to Example 6.
Figure 31:
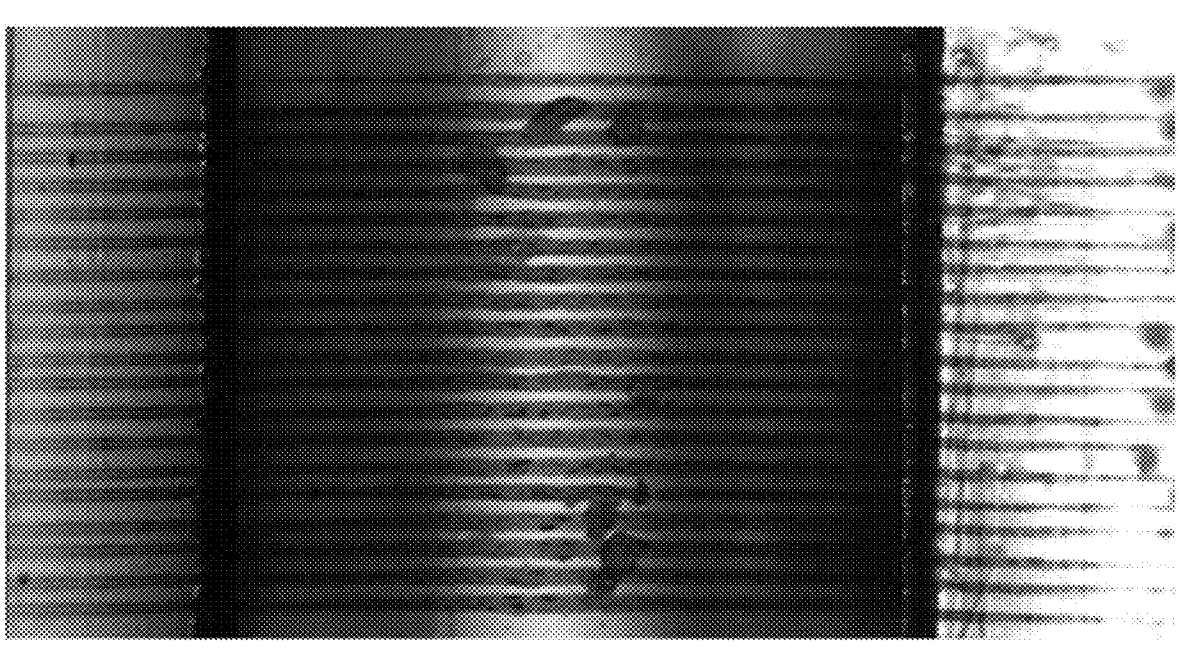
FIG. 31 illustrates a printing result using ink according to Example 7.

FIG. 21 illustrates a printing result using ink according to Example 1, FIG. 22 illustrates a printing result using ink according to Example 2, FIG. 23 illustrates a result of forming a masking pattern using ink and forming a side surface wiring according to Example 1, FIG. 24 illustrates a result of evaluating adhesion force after applying ink on top of a PET film according to Example 1, FIG. 25 illustrates a result of evaluating peeling characteristics of ink according to Example 1, FIG. 26 illustrates a result of evaluating a name pen removal power of ink according to Example 1, FIG. 27 illustrates a printing result using ink according to Example 3, FIG. 28 illustrates a printing result using ink according to Example 4, FIG. 29 illustrates a printing result using ink according to Example 5, FIG. 30 illustrates a printing result using ink according to Example 6; and FIG. 31 illustrates a printing result using ink according to Example 7.

As mentioned above, a 3D surface printing apparatus for edge area of the substrate according to the present disclosure may be used to form a masking pattern for forming a side surface wiring. Therefore, the masking ink is characterized of being capable of being dissolved (removed) by a polar solvent such as water or alcohol, etc.

Further, it is desirable that the sintering or drying temperature of the masking ink is 150° C. or below. In a case where the material of the substrate 112 is a PET film, there is a problem that it may generate a curl when the temperature is 150° C. or above. Most desirably, the temperature is desirably 120° C. or below.

The masking ink may be composed to include a water-soluble polymer, a solvent for dissolving the water-soluble polymer, a first additive to impart electrical conductivity to the ink, and a second additive to impart a thixotropic index (T.I).

The water-soluble polymer refers to a polymer that can be dissolved by a polar solvent, and the water-soluble polymer includes polymer functional groups such as hydroxyl group (—OH), amide group (—$CONH_2$), ether group (—C—O—C), primary amine (—$NH_2$), secondary amine (—NHR), tertiary amine (—RNR), carboxyl group (—$COO\text{-}M^+$), sulfonic group (—SOOM), phosphoric acid group (—OPOOM), and sulfate group (—OSOOOM). Specific examples that may be used include starch, gums, polysaccharide, cellulose having hydroxyl groups, poly(acrylicpolyol) (PAO), polyethylene oxide (PEO), polyvinyl alcohol (PVA), polyacrylamide (PAAM), polyvinylpyrrolidone (PVP), Polyacrylic acid (PAA), polystyrenesulfonic acid (PSSA), polyphosphoric acid (PPA), polyethylenesulfonic acid (PESA), polyethyleneimide (PEI), polyamines (PA), polyamideamine (PAMAM), poly(2-vinylpiperidine salt), and Poly(vinylamine salt). It is desirable that the water-soluble polymer has a molecular weight (Mw) between 500 and 1,000,000. If the molecular weight is less than 500, there is a problem in that the electric field reactivity of the EHD and adhesion force with the substrate are poor. On the other hand, if the molecular weight is 1,000,000, or more, the viscosity becomes very high, making printing difficult.

The solvent for dissolving the water-soluble polymer is not particularly limited as long as it dissolves the water-soluble polymer, but a polar solvent may be mainly used. In particular, from an environmental standpoint, it is desirable to use water, alcohol, or a mixture of water and alcohol.

The first additive is for imparting electrical conductivity of the ink, and electrolyte or conductive particles may be used. Electrolyte refers to a substance that is split into ions in an aqueous solution state through which electric current flows. Any one or more of sodium chloride (NaCl), sulfonic acid, hydrochloric acid, sodium hydroxide (NaOH), and potassium hydroxide (KOH) can be used.

Conductive particles refer to nanoparticles with metal or non-metal conductivity, and typically, any one or more of silver (Ag), nanoparticles, gold (Au) nanoparticles, conductive carbon nanoparticles, and conductive polymer dispersions may be used.

The second additive is used to adjust the fluidity of the ink printed on the substrate after the printing. RHEBYK-100, RHEBYK-405, RHEBYK-410, RHEBYK-411, RHEBYK-440, RHEBYK-7405 and the like may be used as organic T.I imparting agents. Synthetic fine silica, bentonite-based, and ultra-fine precipitated calcium carbonate may be used as inorganic T.I imparting agents.

Example 1

<Preparing Ink>

100 g of Polyvinylpyrrolide (PVP) with molecular weight (Mw) of 10,000 was completely dissolved in 100 g of ethanol and 100 g of deionized water. Ink was prepared by mixing 5.0 g of sodium chloride (NaCl) as an electrolyte and 50 g of synthetic fine silica (SS-SIL 530, S-chemtech Co., Ltd.) into the dissolved solution and completely dispersing it using a 3-roll milling. The electrical conductivity of the ink prepared in this way was 100 KΩ. The prepared masking ink (water soluble masking ink, hereinafter referred to as MSI ink) was printed on an edge area of 0.5T PET film using a 3D surface printing apparatus for edge area of the substrate according to the present disclosure. After printing, and then drying at 80° C. for 30 minutes, results of measuring each of the three printed surfaces using an optical microscope are as shown in FIG. 21.

Example 2

The same procedure as Example 1 was performed, except that 0.5 g of sodium chloride (NaCl) was used. Here, the electrical conductivity of the solution was 50M. The printing results are shown in FIG. 22. As shown in FIG. 22, the printed line width was very thick, of 200 μm or more, and clumping of ink appeared on the left and right side surfaces, so the straightness of the ink was very poor.

The ink prepared in Example 1 was used to print with a line width of 150 μm and space of 250 μm. After printing, it was dried at 80° C. for 30 minutes. The dried PET substrate was deposited to a thickness of 300 nm thickness using a Au deposition equipment. After deposition, it was immersed in a mixed solution of 500 ml of water and 500 ml of ethanol and treated for 5 minutes using ultrasound. Its results are as shown in FIG. 23. After depositing as in FIG. 23, it can be confirmed that the MSI ink was completely removed by the aqueous solution, and that a 3D wiring with a line width of 250 μm is formed without damage to the removed Au layer.

<Adhesion Force Evaluation>

The MSI ink prepared in Example 1 was applied to a thickness of 5 μm on top of the PET film using a spinning coater. After applying the MSI ink, it was dried at 80° C. for 30 minutes. The film prepared in this way was tested for adhesion force in the adhesion force evaluation (cross-cut test (ASTM D3359)) method. Its results are as shown in FIG. 24. The adhesion force evaluation result was 5B, indicating excellent adhesion to PET film.

<Peeling (Removing) Characteristics (Water Peeling) Test>

1) Peeling Characteristics Evaluation after Printing on PET Film

The MSI ink prepared in Example 1 was printed on PET film to have a line width of 300 μm/height of 10 μm, then dried (80° C./30 min) and immersed in ultrapure water (D.I water) at room temperature for 5 minutes. As shown in FIG. 25, it was confirmed that the MSI ink was completely removed.

2) Name Pen Removing Force Evaluation

The ink prepared in Example 1 was spin coated on top of PET film to have a thickness of 100 μm. It was dried (80° C./30 min), marked with a black name pen, and then immersed in ultrapure water for 5 minutes. As shown in FIG. 26, it can be confirmed that the MSI ink was completely removed by water by confirming that the name pen on the coating layer was removed.

Example 3

The same procedure as Example 1 was performed, but polyacrylic acid (PAA), a water-soluble polymer with a molecular weight of 250,000, was used. After being dried for 30 minutes at 80° C., its results are as shown in FIG. 27. Each printed height and line width were analyzed using a 3D surface profiler. Its results are shown below FIG. 27. The height is 2.5~3.2 μm and line width is between 52~55 μm, indicating excellent uniformity.

Example 4

The same procedure as Example 1 was performed, but electrolyte was not used. As shown in FIG. 28, the printed line width was very thick, 300 μm or above, and ink clumping phenomenon occurred on the left and right side surfaces, and thus the straightness of the ink was very poor.

Example 5

The same procedure as Example 1 was performed, but the T.I imparting agent was not used. As illustrated in FIG. 29, the printing straightness is good during printing, but there is a problem in that the printing is split on the left and right side surfaces.

Example 6

The same procedure as Example 3 was performed, except that 50 g of conductive carbon nanoparticles (20 nm) were used as conductive particles. FIG. 30 shows the results of printing on PET film. The line width was 10 μm and the space between lines was 10 μm, allowing for uniform straightness and narrow space, enabling high-precision (fine pitch) printing.

Example 7

The same procedure as Example 3 was performed, except that 50 g of conductive silver (Ag) nanoparticles (50 nm) were used as conductive particles. FIG. 31 shows the results of printing on the side surface of the PET film. The line width was 10 μm and the space between lines was 10 μm, allowing for uniform straightness and narrow space, enabling high-precision (fine pitch) printing

| | Water-soluble polymer | Water-soluble polymer molecular weight (Mw) | Water-soluble polymer (g) | Deionized water (g) | Ethanol (g) | Electrolyte type | Electrolyte (g) | T.I imparting agent | T.I imparting agent (g) | Conductive particle type | Conductive particle | Electrical conductivity of solution (Ω) |
|---|---|---|---|---|---|---|---|---|---|---|---|---|
| Example 1 | PVP | 10,000 | 100 | 100 | 100 | NaCl | 5.0 | Synthetic fine silica | 50 | | | 100 KΩ |
| Example 2 | PVP | 10,000 | 100 | 100 | 100 | NaCl | 0.5 | Synthetic fine silica | 50 | | | 50 MΩ |
| Example 3 | PVP | 250,000 | 100 | 100 | 100 | NaCl | 3.0 | Synthetic fine silica | 50 | | | 500 KΩ |
| Example 4 | PVP | 10,000 | 100 | 100 | 100 | X | X | Synthetic fine silica | 50 | | | Isolation (not measured) |
| Example 5 | PVP | 10,000 | 100 | 100 | 100 | NaCl | 5.0 | Synthetic fine silica | X | | | 100 KΩ |
| Example 6 | PVP | 250,000 | 100 | 100 | 100 | NaCl | 5.0 | Synthetic fine silica | 50 | Carbon nano particles (20 nm) | 50 | 50 KΩ |
| Example 7 | PVP | 250,000 | 100 | 100 | 100 | NaCl | 5.0 | Synthetic fine silica | 50 | Ag nano particles (50 nm) | 50 | 10 KΩ |

Further, using the 3D surface printing apparatus for edge area according to the present disclosure, the side surface wiring may be printed directly. In this case, the ink may be formed as a conductive ink that forms an electrode.

The scope of the present disclosure is not limited to the above-described embodiments, but may be implemented in various forms of embodiments within the scope of the attached patent claims.

It is considered to be within the scope of the claims of the present disclosure to the extent that anyone skilled in the art can make modifications without departing from the gist of the invention as claimed in the claims.

REFERENCE NUMERALS

10: Display Module
110: TFT Substrate
112: Substrate
114: TFT Layer
115: Pixel Area
120: Side Surface Wiring
**130*a***: First Access Pad
**130*b***: Second Access Pad
150: Micro LED
155: Black Matrix
160: Transparent Cover Layer
180: Masking Layer
182: Masking Pattern
185: Metal Thin Film Layer
310: Zig Part
320: Nozzle Part
322: Nozzle
323: Electrode
324: Nozzle Angle Alteration Part
325: High Voltage Controller
326: Pneumatic Controller
327: Syringe Pump
330: Moving Part
332: Up and Down Moving Part
340: Imaging Part
350: Control Part

What is claimed is:

1. A 3D surface printing apparatus for an edge area of a substrate, the apparatus comprising:

a nozzle assembly that comprises a nozzle that is disposed outside of a side surface of the substrate, configured to eject ink in a direction parallel to a surface of the substrate, through Electrohydrodynamic (EHD) jetting by applying a voltage to an electrode;

an actuator configured to move the nozzle back and forth in a direction normal to the surface of the substrate around a rim of the substrate; and a controller that controls a printing operation, wherein the actuator is configured to print a pattern that is continuously extends along a front surface of the rim of the substrate, a side surface of the substrate, and a rear surface of the rim of the substrate while moving the nozzle back and forth, wherein the controller is configured to control the printing operation based on a detected 3D electric field distribution, the distribution being determined according to a shape and material of a structure surrounding an area being printed and a previously-printed pattern, and wherein the controller is configured to control the printing operation by adjusting at least one of the voltage applied to the electrode, a flow rate of ink ejected from the nozzle, and a moving speed of the nozzle as printing proceeds, in response to changes in the 3D electric field distribution, so as to minimize an effect of the changes in the 3D electric field distribution caused by changes in the shape and material of the structure surrounding the area being printed and caused by the previously-printed pattern.

2. The 3D surface printing apparatus for the edge area of a substrate, according to claim 1, the apparatus further comprising:

a jig part that vertically erects the substrate and immobilizes it, wherein the nozzle ejects the ink from above the erected substrate to vertically downwards, and the moving part moves the nozzle to left and right in the normal vector direction of the erected substrate.

3. The 3D surface printing apparatus for the edge area of a substrate, according to claim 1, wherein the moving part moves the nozzle also in a direction that is horizontal to the substrate, and wherein the control part controls a distance between the nozzle and the side surface of the substrate, during printing, as it moves the nozzle in both directions.

4. The 3D surface printing apparatus for the edge area of a substrate, according to claim 1, the apparatus further comprising:

a nozzle angle alteration part that alters an angle of the nozzle, wherein the nozzle angle alteration part alters the angle of the nozzle towards the substrate when moving the nozzle towards the substrate by the moving part.

5. The 3D surface printing apparatus for the edge area of a substrate, according to claim 1, further comprising:

a substrate angle alteration part that alters an angle of the substrate, wherein the substrate angle alteration part alters the angle of the substrate towards the nozzle when moving the nozzle towards the substrate by the moving part.

6. The 3D surface printing apparatus for the edge area of a substrate, according to claim 1, wherein the controller obtains, through simulation, the changes in 3D electric field distribution that occur due to changes of the shape and material of the structure surrounding the area being printed and the pre-printed pattern, as printing proceeds.

7. The 3D surface printing apparatus for the edge area of a substrate, according to claim 6, wherein the controller considers the changes in 3D electric field distribution that occur due to changes of temperature or humidity as printing proceeds.

8. The 3D surface printing apparatus for the edge area of a substrate, according to claim 1, wherein the controller controls the voltage being applied to the electrode or controls a flow rate of the ink being ejected from the nozzle, considering the changes in 3D electric field distribution that occur due to the pre-printed pattern.

9. The 3D surface printing apparatus for the edge area of a substrate, according to claim 1, further comprising:

an imaging part that photographs an image of the ink being ejected from the nozzle, wherein the controller measures a diameter of the ink being ejected from the nozzle, based on the image photographed by the imaging part, and prints while controlling the diameter of the ink, in real time.

10. The 3D surface printing apparatus for the edge area of a substrate, according to claim 1, further comprising:

an imaging part that photographs a line patterned on the substrate, wherein the controller obtains a line width of the patterned line based on an image photographed by the imaging part, and stores information of the line width and printing conditions regarding the line width, and predicts a diameter of the ink being ejected from the nozzle based on changes of the line width, and prints while controlling the diameter of the ink, in real time.

11. The 3D surface printing apparatus for the edge area of a substrate, according to claim 10, wherein the controller predicts the diameter of the ink being ejected from the nozzle based on the information of the line width of the line patterned on a same substrate.

12. The 3D surface printing apparatus for the edge area of a substrate, according to claim 10, wherein the controller predicts the diameter of the ink being ejected from the nozzle based on the information of the line width of the patterned line, stored regarding a plurality of substrates, in repetitive printing processes.

13. The 3D surface printing apparatus for the edge area of a substrate, according to claim 1, wherein the substrate is any one of a plastic substrate, a glass substrate, a silicon substrate, and a substrate where plastic and glass are formed in a multiple layer form.

14. The 3D surface printing apparatus for the edge area of a substrate, according to claim 9, wherein the controller controls the diameter to be constant.

15. The 3D surface printing apparatus for the edge area of a substrate, according to claim 9, wherein the controller controls the diameter by controlling at least one of a distance between the nozzle and the substrate, a size of the voltage being applied to the electrode for the Electrohydrodynamic (EHD) jetting, a flow rate of the ink being ejected from the nozzle, and an ejecting angle.

16. The 3D surface printing apparatus for the edge area of a substrate, according to claim 8, wherein the nozzle assembly further comprises a pneumatic controller that controls a pneumatic inside the nozzle, and wherein the controller controls the flow rate of the ink by controlling the pneumatic.

17. The 3D surface printing apparatus for the edge area of a substrate, according to claim 8, further comprising:

a syringe pump that supplies ink to inside of the nozzle, wherein the controller controls the flow rate of the ink by controlling the syringe pump.

18. The 3D surface printing apparatus for the edge area of a substrate, according to claim 1, wherein a line width of the pattern being printed is 5 μm to 15 μm or less.

19. The 3D surface printing apparatus for the edge area of a substrate, according to claim 1, wherein a line width of the pattern being printed is 150 μm or less in side surface wiring for preparing a 300 PPI grade display, 50 μm or less in side surface wiring for preparing a 600 PPI grade display, 20 μm or less in side surface wiring for preparing a 800 PPI grade display, and 10 μm or less in side surface wiring for preparing a 1000 PPI grade display.

20. The 3D surface printing apparatus for the edge area of a substrate, according to claim 1, wherein the ink is masking ink, that is dissolvable by a polar solvent.

21. The 3D surface printing apparatus for the edge area of a substrate, according to claim 20, wherein the ink comprises a water-soluble polymer, a solvent for dissolving the water-soluble polymer, a first additive for imparting electrical conductivity, and a second additive for imparting a Thixotropic Index (T.I).

22. The 3D surface printing apparatus for the edge area of a substrate, according to claim 21, wherein the water-soluble polymer comprises any one or more of starch, gums, polysaccharide, cellulose having hydroxyl groups, poly (acrylicpolyol) (PAO), polyethylene oxide (PEO), polyvinyl alcohol (PVA), polyacrylamide (PAAM), Polyvinylpyrrolidone (PVP), Polyacrylic acid (PAA), polystyrenesulfonic acid (PSSA), polyphosphoric acid (PPA), polyethylenesulfonic acid (PESA), polyethyleneimide (PEI), polyamines (PA), polyamideamine (PAMAM), poly (2-vinylpiperidine salt), and Poly (vinylamine salt), and the solvent is water or alcohol.

23. The 3D surface printing apparatus for the edge area of a substrate, according to claim 21, wherein the first additive is an electrolyte.

24. The 3D surface printing apparatus for the edge area of a substrate, according to claim 23, wherein the electrolyte comprises any one or more of sodium chloride (NaCl), sulfonic acid, hydrochloric acid, sodium hydroxide (NaOH), and potassium hydroxide (KOH).

25. The 3D surface printing apparatus for the edge area of a substrate, according to claim 23, wherein the first additive further comprises conductive particles.

26. The 3D surface printing apparatus for the edge area of a substrate, according to claim 25, wherein the conductive particles comprise any one or more of silver (Ag) nanoparticles, gold (Au) nanoparticles, carbon nanoparticles, copper particles, and metallic material containing conductive polymer dispersion.

27. The 3D surface printing apparatus for the edge area of a substrate, according to claim 1, wherein the ink is a conductive ink that forms a side surface wiring.

* * * * *